US012663256B2

(12) United States Patent
Rapp et al.

(10) Patent No.: US 12,663,256 B2
(45) Date of Patent: Jun. 23, 2026

(54) SYSTEMS AND METHODS FOR MULTI-SURFACE PROFILE ESTIMATION VIA OPTICAL COHERENCE TOMOGRAPHY

(71) Applicant: Mitsubishi Electric Research Laboratories, Inc., Cambridge, MA (US)

(72) Inventors: Joshua Rapp, Somerville, MA (US); Hassan Mansour, Cambridge, MA (US); Petros Boufounos, Winchester, MA (US); Toshiaki Koike Akino, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 251 days.

(21) Appl. No.: 18/389,867

(22) Filed: Dec. 20, 2023

(65) Prior Publication Data

US 2025/0207906 A1     Jun. 26, 2025

(51) Int. Cl.
  *G01B 9/02091*  (2022.01)
  *G01B 9/02*  (2022.01)
  *G01B 9/02055*  (2022.01)
  *G01B 11/30*  (2006.01)

(52) U.S. Cl.
  CPC ..... *G01B 9/02091* (2013.01); *G01B 9/02044* (2013.01); *G01B 9/0207* (2013.01); *G01B 11/30* (2013.01)

(58) Field of Classification Search
  CPC ........... G01B 9/02091; G01B 9/02044; G01B 9/0207; G01B 9/02083; A61B 5/0066; A61B 3/102
  See application file for complete search history.

(56) References Cited

U.S. PATENT DOCUMENTS 6,293,674 B1 *  9/2001  Huang ...................... G06T 7/60
                                                    351/221
7,321,431 B2    1/2008  De Groot et al.
            (Continued)

OTHER PUBLICATIONS

Patrick Steiner, Jens H. Kowal, Boris Považay, Christoph Meier, and Raphael Sznitman, "Automatic estimation of noise parameters in Fourier-domain optical coherence tomography cross sectional images using statistical information," Appl. Opt. 54, 3650-3657 (2015)) (Year: 2015).*

(Continued)

*Primary Examiner* — Kara E. Geisel
*Assistant Examiner* — Jonathon Cook
(74) *Attorney, Agent, or Firm* — Gene Vinokur

(57)     ABSTRACT

An optical coherence tomography (OCT) system comprises an interferometer configured to interfere a test beam reflected from a specimen with a reference beam to produce an interference pattern. The OCT system also comprises a spectrometer configured to measure a spectrum of the interference pattern to produce measurements of intensities of the interference pattern corresponding to different wavelengths. The OCT system further comprises a processor configured to determine noise statistics of the intensities of the interference pattern and use the noise statistics to set a threshold for detecting a number of layers of the specimen penetrated by the test beam at the location based on a pre-specified probability of false acceptance of noise as a signal. The processor is further configured to determine the profilometry measurements as an estimate of depths of the layers of the specimen causing the intensities of the interference pattern above the threshold.

20 Claims, 17 Drawing Sheets

(56)          References Cited

U.S. PATENT DOCUMENTS

| | | | | |
|---|---|---|---|---|
| 7,636,168 | B2 | 12/2009 | De Lega et al. | |
| 7,812,963 | B2 | 10/2010 | De Groot et al. | |
| 2009/0303438 | A1* | 12/2009 | Yamada | A61B 3/1225 |
| | | | | 351/206 |
| 2011/0141259 | A1* | 6/2011 | Nakano | A61B 3/0025 |
| | | | | 348/78 |
| 2013/0166239 | A1* | 6/2013 | Ota | G01B 9/02091 |
| | | | | 356/497 |
| 2016/0317016 | A1* | 11/2016 | Oishi | A61B 3/102 |
| 2018/0122077 | A1* | 5/2018 | Wada | G06T 5/70 |
| 2019/0298167 | A1* | 10/2019 | Lapierre-Landry | A61B 3/102 |
| 2021/0290052 | A1* | 9/2021 | Faini | G01B 9/02091 |

OTHER PUBLICATIONS

International Search Report and Written Opinion of the International Searching Authority for international application No. PCT/JP2023/022335, prepared by the European Patent Office, including citations D1-D3.

Li Chengshuai et al: "Maximum Likelihood Estimation of Optical Path Length in Spectral Interferometry", Journal of Lightwave Technology, vol. 35, No. 22, Nov. 1, 2017 (Nov. 1, 2017), pp. 4880-4887, XP093081440, USA ISSN: 0733-8724, DOI: 10.1109/JLT.2017.2743214.

Qi Yi et al: "A fast Maximum Likelihood Estimation algorithm for demodulating Fiber White-Light Interferometry", Journal of Physics: Conference Series, vol. 1065, Aug. 1, 2018 (Aug. 1, 2018), p. 252004, XP093081444, GB ISSN: 1742-6588, DOI: 10.1088/1742-6596/1065/25/252004 Retrieved from the Internet: URL:https://iopscience.iop.org/article/10.1088/1742-6596/1065/25/252004/pdf.

Kiselev Ilia et al: "Precision of evaluation methods in white light interferometry. Correlogram correlation method", Measurement, Institute of Measurement and Control. London, GB, vol. 123, Mar. 26, 2018 (Mar. 26, 2018), pp. 125-128, XP085387301, ISSN: 0263-2241, DOI: 10.1016/J.MEASUREMENT.2018.03.060.

S. Lawman and H. Liang, "Fourier domain optical coherence tomography for high-precision profilometry," in Proc. SPIE, vol. 7391, Jul. 2009, pp. 151-162. doi: 10.1117/12.827518.

* cited by examiner $$A \begin{bmatrix} S(k_0)\exp(i\,2k_0z_0) & S(k_0)\exp(i\,2k_0z_1) & \cdots & S(k_0)\exp(i\,2k_0z_{M-1}) \\ S(k_1)\exp(i\,2k_1z_0) & S(k_1)\exp(i\,2k_1z_1) & \cdots & S(k_1)\exp(i\,2k_1z_{M-1}) \\ \cdots & \cdots & & \cdots \\ S(k_{N-1})\exp(i\,2k_{N-1}z_0) & S(k_{N-1})\exp(i\,2k_{N-1}z_1) & \cdots & S(k_{N-1})\exp(i\,2k_{N-1}z_{M-1}) \end{bmatrix}$$

FIG. 3C

SYSTEMS AND METHODS FOR MULTI-SURFACE PROFILE ESTIMATION VIA OPTICAL COHERENCE TOMOGRAPHY

TECHNICAL FIELD

The present disclosure relates generally to imaging, sensing, non-contact surface profilometry, and interferometry, particularly for optical depth measurement.

BACKGROUND

Profilometry is a technique used to extract topographical data from a surface. This can be a single point, a line scan or even a full three-dimensional scan. The purpose of profilometry is to get surface morphology, step heights and surface roughness. In many applications, electromagnetic sensing is used for profilometry measurements to obtain information about the surface or subsurface of a particular specimen. One such technique is tomography. Tomography can be used for various applications, for example, radiology, biology, materials science, manufacturing, quality assurance, quality control, or the like. Some types of tomography include, for example, optical coherence tomography (OCT), x-ray tomography, positron emission tomography, optical projection tomography, and the like. OCT technology is used to perform high-resolution cross-sectional imaging. It is often applied to imaging biological tissue structures, such as the human eye, for example, on microscopic scales in real time. Optical waves are reflected from an object or sample and a computer produces images of cross sections or three-dimensional volume renderings of the sample by using information on how the waves are changed upon reflection.

OCT is an interferometric imaging technique that coherently mixes an optical signal from the target with a reference signal. OCT offers non-invasive, noncontact label-free imaging of the specimen with micron-scale resolution in three dimensions. Due to the ability of OCT to achieve micron-scale resolution, it is used across various technical disciplines including factory automation process checking the integrity of assembly or manufacturing operations, as well as in various medical specialties including ophthalmology and cardiology.

OCT may be performed based on time-domain processing (time-domain OCT or TD-OCT) or Fourier-domain processing (Fourier-domain OCT or FD-OCT). In time domain OCT (TD-OCT), the path length difference between light returning from the sample and reference light is translated longitudinally in time to recover the depth information in the sample. In frequency-domain or Fourier-domain OCT (FD-OCT), the broadband interference between reflected sample light and reference light is acquired in the frequency domain and a Fourier transform is used to recover the depth information.

Often the surface under inspection is not opaque, or there is an opaque surface under one or more semi-transparent layers. For example, photoresist may be deposited as a thin film in lithography, or the oil or water dielectric may be on a component in wire EDM. Surface mapping of an opaque surface is well understood, since there is a single layer per location, but when there is the possibility for multiple layers, the number of layers at each point must be estimated or known in advance. Attempts in this regard have mainly relied on the use of low-coherence interferometry. However, such approaches use ad hoc methods of determining how many surfaces there are to detect or which peaks in a spectrum correspond to surfaces and which are noise. Specifically, they assume a certain number of layers per point, or they may choose layers whose amplitude is above a certain threshold. However, the threshold is not chosen in a principled manner. As such, currently available solutions are only deployable when the number of layers is known in advance. Therefore, it is difficult to determine a principled threshold if the surface reflectivity is not known in advance.

Accordingly, better approaches aimed at robust estimation of depths for multi-layered specimens and thereby their profilometric measurements are desired.

SUMMARY

It is an object of some embodiments to provide an optical coherence tomography (OCT) system and method for producing profilometry measurements of a specimen. Additionally, it is an object of some embodiments to provide a principled approach for detecting multiple layers in the specimen and precisely estimating their locations. In this regard, some embodiments are directed towards methods, systems, and computer programs for profilometry measurements of an unknown number of layers of a specimen.

The depths of multiple reflective surfaces may be estimated with high resolution over sufficient specimen thickness using OCT technology. Some embodiments are based on the realization that such depth estimation entails finding the frequency with the largest energy in the measurement. However, estimating the depths of multiple reflective, semi-transparent surfaces is much more challenging because the number of layers cannot always be known perfectly in advance. Some embodiments are based on recognizing that estimating the number of layers of the specimen from analysis of a reflected signal is not reliable due to its strong dependency on the type of the specimen and low SNR values. Even when there is strong prior information about the specimen properties (e.g., two layers, from a fluid on top of a piece of metal), the actual sample could have air bubbles or dirt or other scatterers, or the fluid layer may be very thin and the layers are indistinguishable, or the fluid has evaporated, etc. Some embodiments are based on the recognition that the number of layers—a discrete number—must be estimated along with the layer positions-a continuous value. Estimating both the number and position of the layers becomes a joint estimation and detection problem. Without knowing the exact number of layers in advance, it is very common to accept spurious layer estimates due to noise.

It is the object of some embodiments to approach this joint problem with an iterative algorithm that first posits a layer position estimate and then makes a decision about whether that estimate is valid. The decision is based on the reflectivity of the layer estimate: if the reflection power is above a threshold, then the detection is accepted and the estimate is valid; otherwise, the layer estimate is discarded. The iterative algorithm sequentially estimates each layer so long as the estimates are accepted, and iteration stops when an estimate is discarded.

Based on the measurement model for OCT, each layer in the sample causes a peak in the spectrum of the interference measurement. Noise also sometimes causes a peak in the spectrum. The challenge is to determine whether a peak is due to signal or noise. A common way to distinguish whether a peak is due to signal or noise is to set a threshold. Above that threshold, the peak is likely due to signal. Below that threshold, the peak is likely noise. The question then becomes how to set the threshold, especially if the amplitude for signal peaks is not known in advance.

Some example embodiments also realize that the key to this approach is the value of the threshold for the reflection power. For high signal-to-noise ratio (SNR) measurements, a threshold may be chosen ad hoc that will easily avoid false acceptance of noise. However, in most practical scenarios especially for low-SNR measurements, careful threshold selection is necessary to avoid falsely accepting noise because peak signal and noise energies may be comparable. Some embodiments are based on recognizing that a principled threshold for deciding between signal (true layers) and noise (spurious layers) can be determined from statistics of the measurement noise alone. Specifically, it is recognized that from estimates of the spatial- and/or time-varying statistics of the measurement noise, a reflection power threshold can be determined that separates signal and noise up to a desired probability of false acceptance. Although the signal amplitude may be unknown, the noise statistics may be estimated using the sample and reference measurements.

To avoid falsely accepting spurious layer estimates, the threshold based on a single FD-OCT measurement may be too conservative, also rejecting true surface estimates. Some embodiments are based on the recognition that to improve the detection process that separates signal from noise, it is imperative to increase the SNR. Some embodiments are also based on recognizing that the SNR can be increased by combining multiple measurements. One approach is to capture multiple independent measurements of the same part of the specimen and incoherently combining their depth-domain magnitudes. Another approach is to use multiple similar measurements from different parts of the specimen and incoherently combine their depth-domain magnitudes. It is the object of some embodiments that the threshold based on a fixed probability of false alarm can likewise be computed from combinations of measurements across space or time, considering the number of combined measurements and their respective noise statistics.

Driven by meticulous experimentations, some example embodiments are directed towards a principled approach to detecting multiple layers and precisely estimating their location. Such a principled approach begins with an exact maximum likelihood estimator (MLE) of the location of a single opaque surface and then integrates the exact MLE into a greedy algorithm that sequentially identifies surface layers whose amplitudes are greater than a certain threshold. Some example embodiments automatically determine the threshold based only on the noise statistics of the acquisition, so the number of surfaces does not need to be known a priori. The spatially varying noise statistics themselves are automatically computed using the sample and reference measurements. An additional feature of some example embodiments is the accommodation for combining multiple acquisitions of the same sample to improve the signal to noise ratio (SNR).

Some example embodiments determine a threshold for distinguishing between signal and noise peaks based on the noise statistics. Some example embodiments choose the threshold so that the probability of noise peak having an amplitude greater than the threshold is below some acceptable probability. Some example embodiments determine the threshold in a way that adapts to the number of measurements that are combined to improve noise robustness. Then all peaks above the threshold may be considered signal peaks corresponding to true surfaces with high probability.

The innovative approaches towards depth estimation described with reference to several example embodiments manifest as improvements in the overall profilometric measurement process in the form of a robust algorithm that requires fewer information than conventional approaches in this field. This in turn leads to lower resource requirements and faster computation. Also, the measurements are more reliable than the conventional approaches.

To achieve the aforementioned objectives and advantages, some example embodiments provide systems, methods, and programs for profilometry measurements of a specimen.

For example, some example embodiments provide an OCT system for profilometry measurements of a specimen. The OCT system comprises an interferometer configured to split incident light into a reference beam and a test beam and interfere a reflection of the test beam, reflected from the specimen, with a reflection of the reference beam, reflected from a reference mirror, to produce an interference pattern. The OCT system also comprises a spectrometer configured to measure a spectrum of the interference pattern to produce measurements of intensities of the interference pattern corresponding to different wavelengths. A computer-readable memory of the OCT system stores executable instructions. The OCT system further comprises a processor configured to determine noise statistics of the intensities of the interference pattern and use the noise statistics to set a threshold for detecting a number of layers of the specimen penetrated by the test beam at the location based on a pre-specified probability of false acceptance of noise as a signal. The processor is further configured to determine the profilometry measurements as an estimate of depths of the layers of the specimen causing the intensities of the interference pattern above the threshold.

Some example embodiments also provide a method for profilometry measurements of a specimen in an OCT system. The method comprises interfering a reflected test beam, reflected from the specimen, with a reflected reference beam, reflected from a reference mirror, to produce an interference pattern and measuring a spectrum of the interference pattern to produce measurements of intensities of the interference pattern corresponding to different wavelengths. The method further comprises determining noise statistics of the intensities of the interference pattern. The noise statistics are used to set a threshold for detecting a number of layers of the specimen penetrated by the test beam at the location based on a pre-specified probability of false acceptance of noise as a signal. The method further comprises determining the profilometry measurements as an estimate of depths of the layers of the specimen causing the intensities of the interference pattern above the threshold.

Some example embodiments also provide a non-transitory computer readable medium having stored thereon computer executable instructions which when executed by a computer, cause the computer to perform a method for profilometry measurements of a specimen in an OCT system. The method comprises interfering a reflected test beam, reflected from the specimen, with a reflected reference beam, reflected from a reference mirror, to produce an interference pattern and measuring a spectrum of the interference pattern to produce measurements of intensities of the interference pattern corresponding to different wavelengths. The method further comprises determining noise statistics of the intensities of the interference pattern. The noise statistics are used to set a threshold for detecting a number of layers of the specimen penetrated by the test beam at the location based on a pre-specified probability of false acceptance of noise as a signal. The method further comprises determining the profilometry measurements as an estimate of depths of the layers of the specimen causing the intensities of the interference pattern above the threshold.

According to some example embodiments, determining the noise statistics comprises obtaining a smooth estimate of the spectrum of the interference pattern defining mean values of the noise statistics for the different wavelengths. The different wavelengths are grouped based on similarities of their mean values to produce groups of wavelengths and a group variance estimate is computed within each of the groups of wavelengths. Each wavelength in a group of wavelengths of the groups of wavelengths is assigned with the corresponding group variance estimate.

According to some example embodiments, the smooth estimate of the spectrum of the interference pattern is obtained from a spectrum of the reference beam.

According to some example embodiments, the method for profilometry measurements further comprises splitting incident illumination into a test beam for illuminating the specimen and a reference beam. The method further comprises receiving, a reflection of the test beam from a location of the specimen, as the reflected test beam and receiving, a reflection of the reference beam from a reference mirror, as the reflected reference beam.

According to some example embodiments, the spectrum comprises a signal intensity peak corresponding to each layer of the different layers of the specimen. Furthermore, for determining the profilometry measurements, the method further comprises identifying at least one candidate intensity peak in the spectrum as at least one signal intensity peak of the signal intensity peaks corresponding to the layers of the specimen, based on the at least one candidate intensity peak having an intensity value above the threshold.

According to some example embodiments, the method further comprises assigning a location of at least one candidate intensity peak having the intensity value above the threshold, as a depth of at least one corresponding layer of the layers of the specimen.

BRIEF DESCRIPTION OF THE DRAWINGS

The presently disclosed embodiments will be further explained with reference to the following drawings. The drawings shown are not necessarily to scale, with emphasis instead generally being placed upon illustrating the principles of the presently disclosed embodiments.

6

Figure 3A:
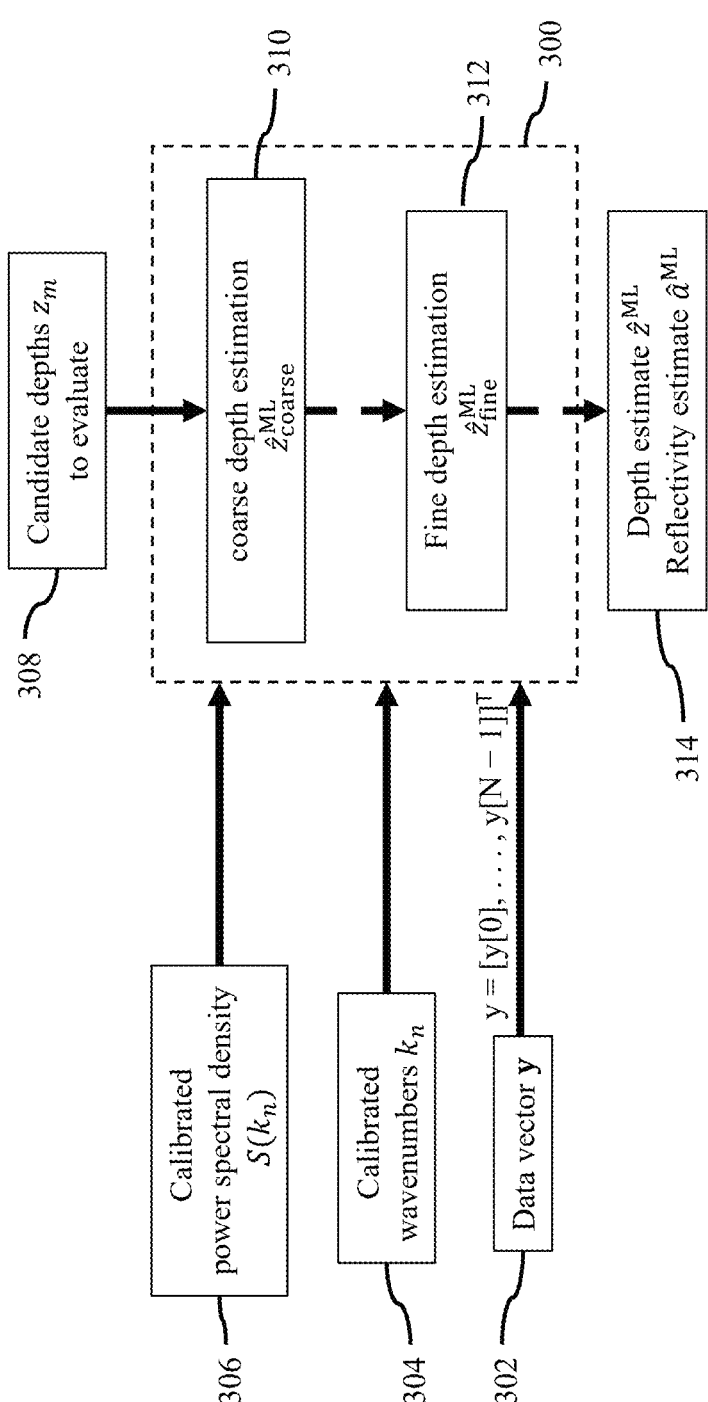
FIG. 3A illustrates a process of determining the maximum likelihood estimator (MLE) for the depth of the specimen surface, according to some example embodiments.
Figure 3B:
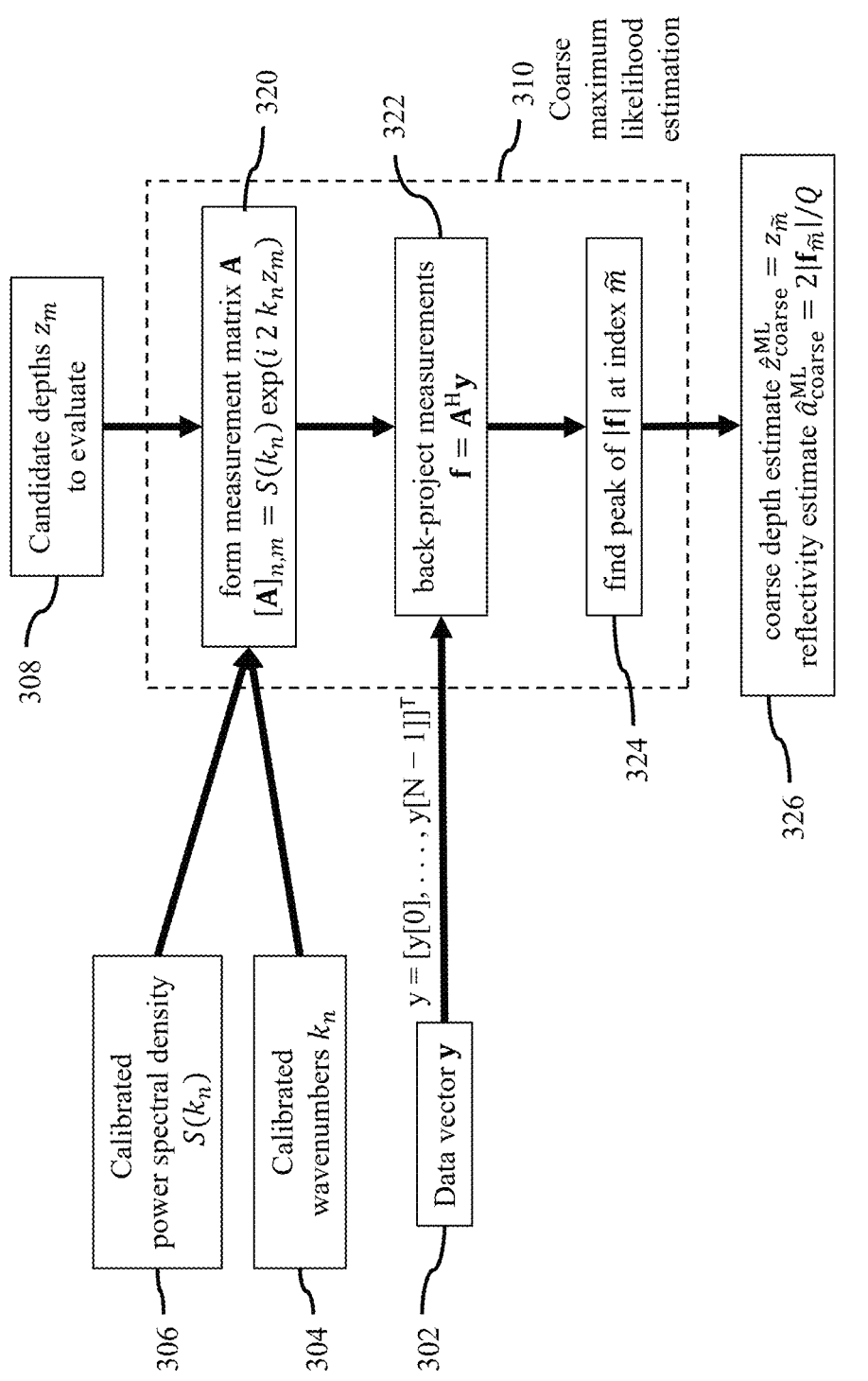
FIG. 3B illustrates the process of initializing the maximum likelihood estimator (MLE) for the depth of the specimen surface via back-projection, according to some example embodiments.
Figure 3D:
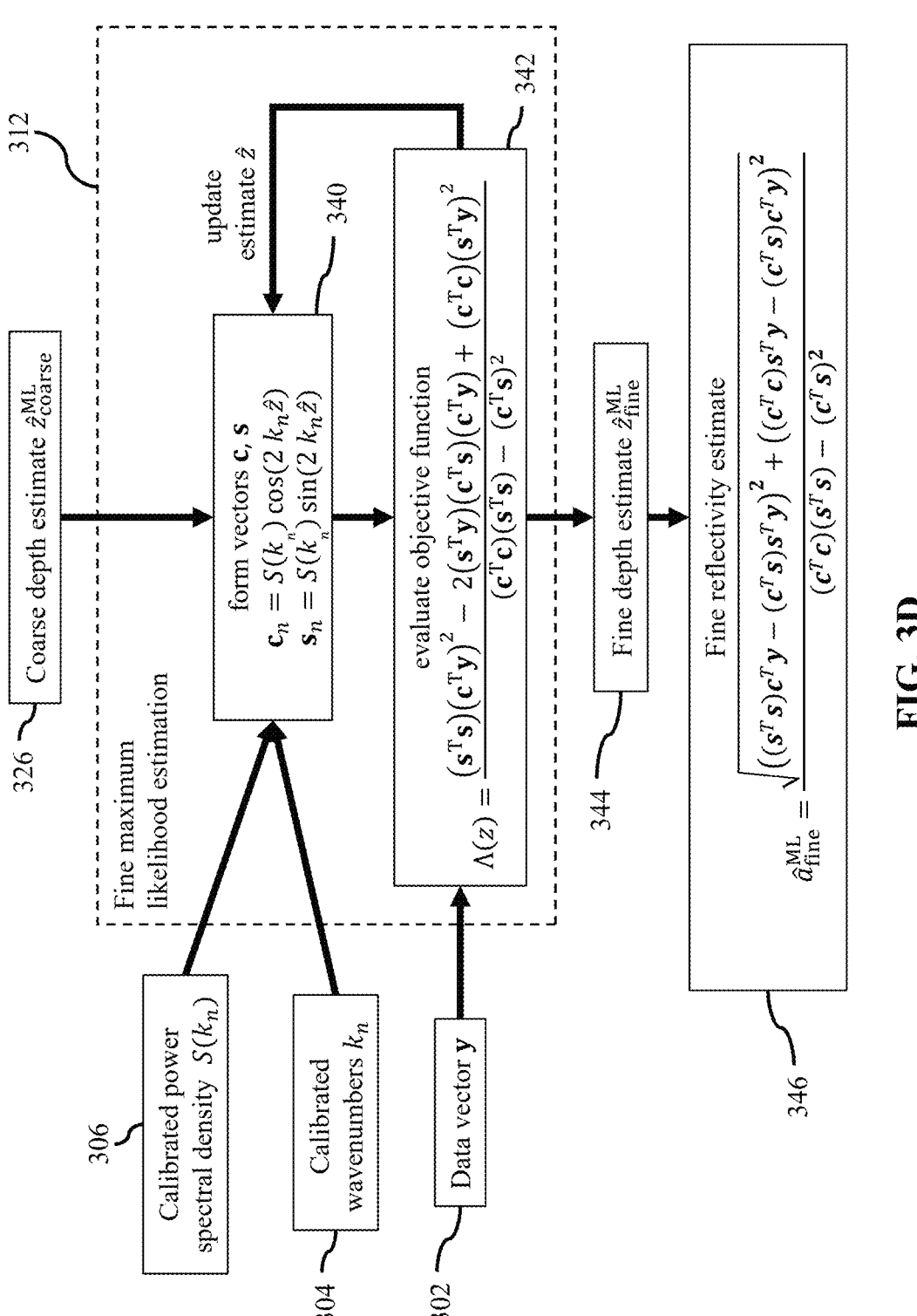
Figure 4:
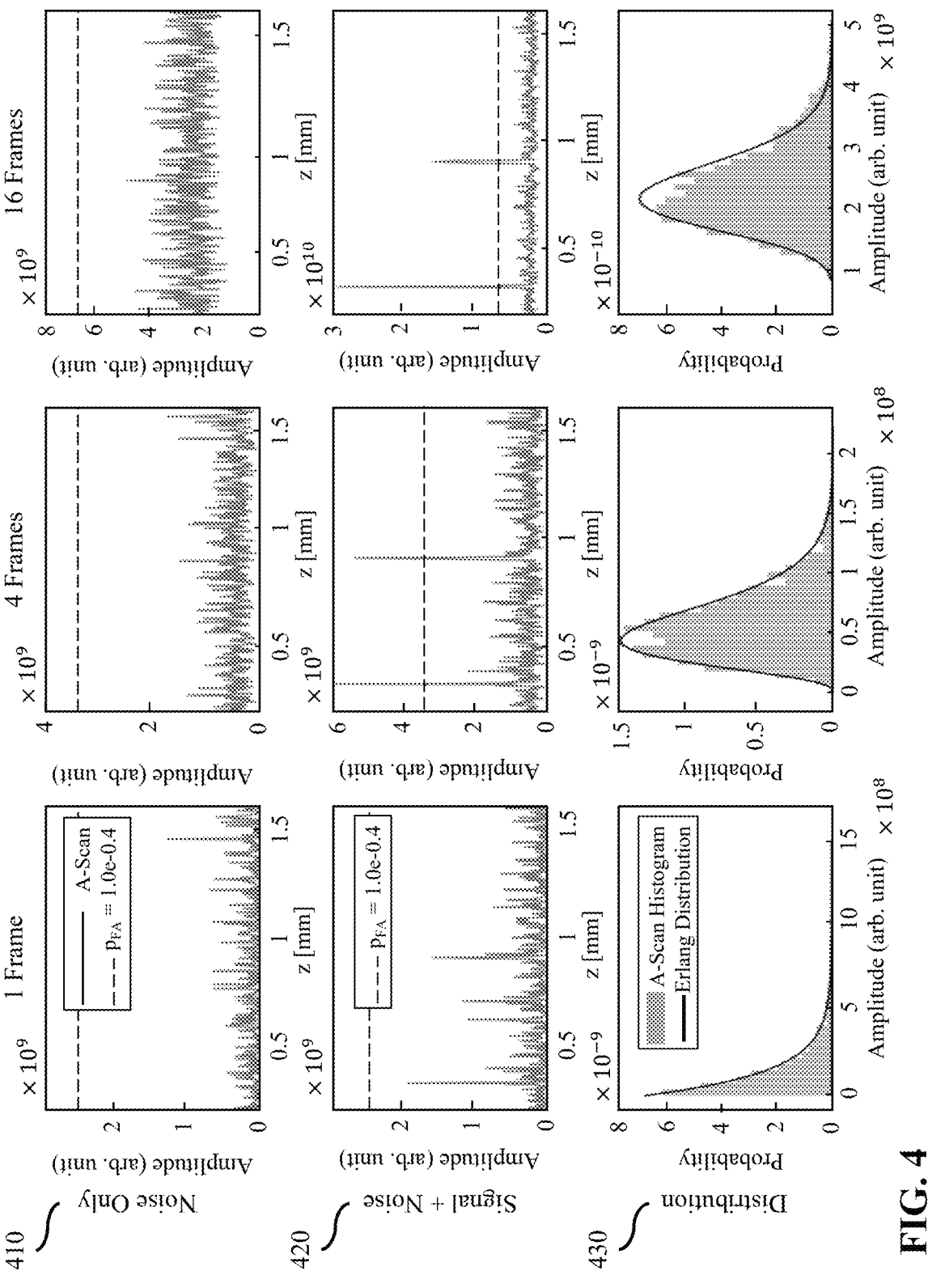
Figure 5:
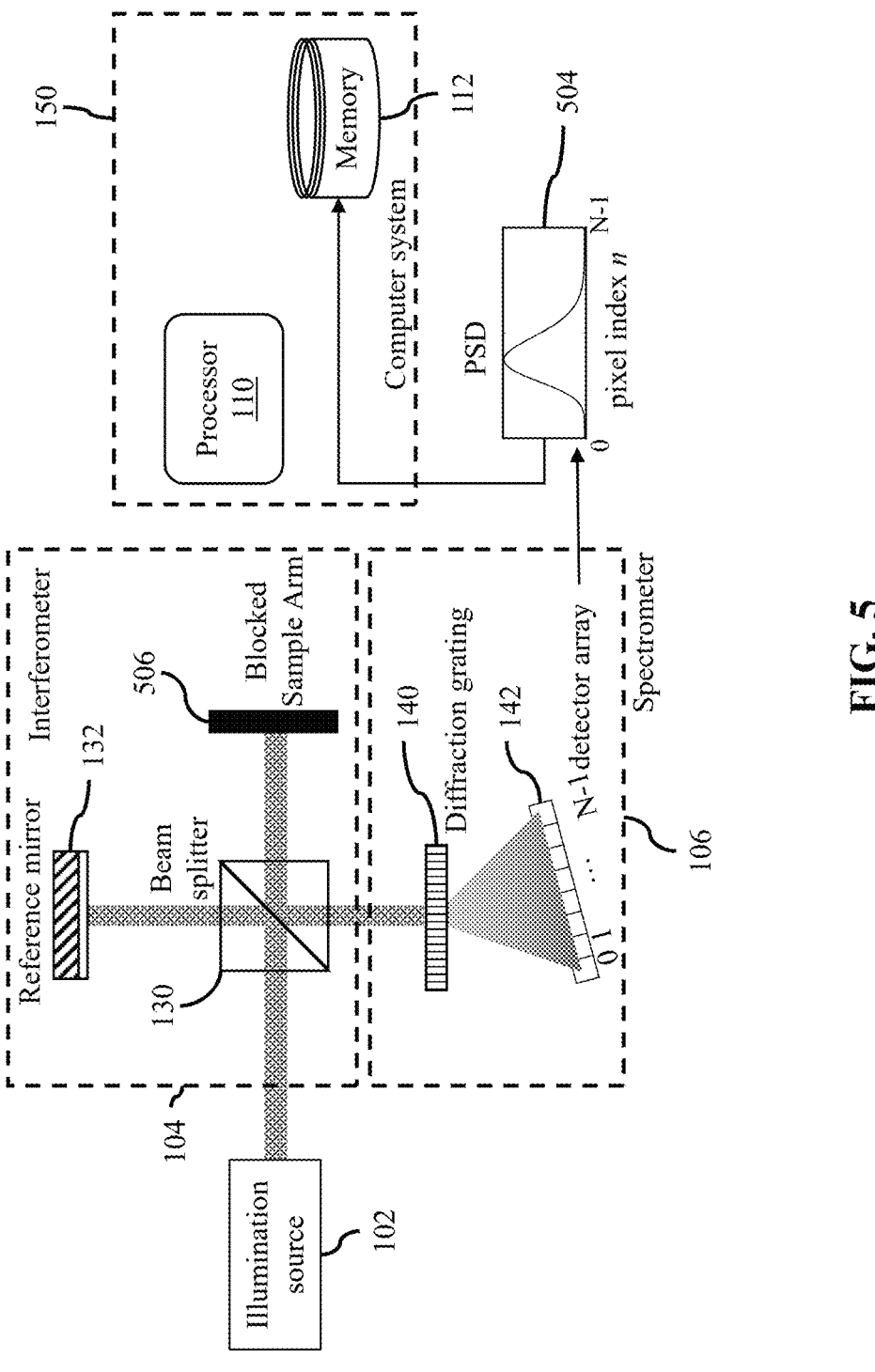
Figure 6:
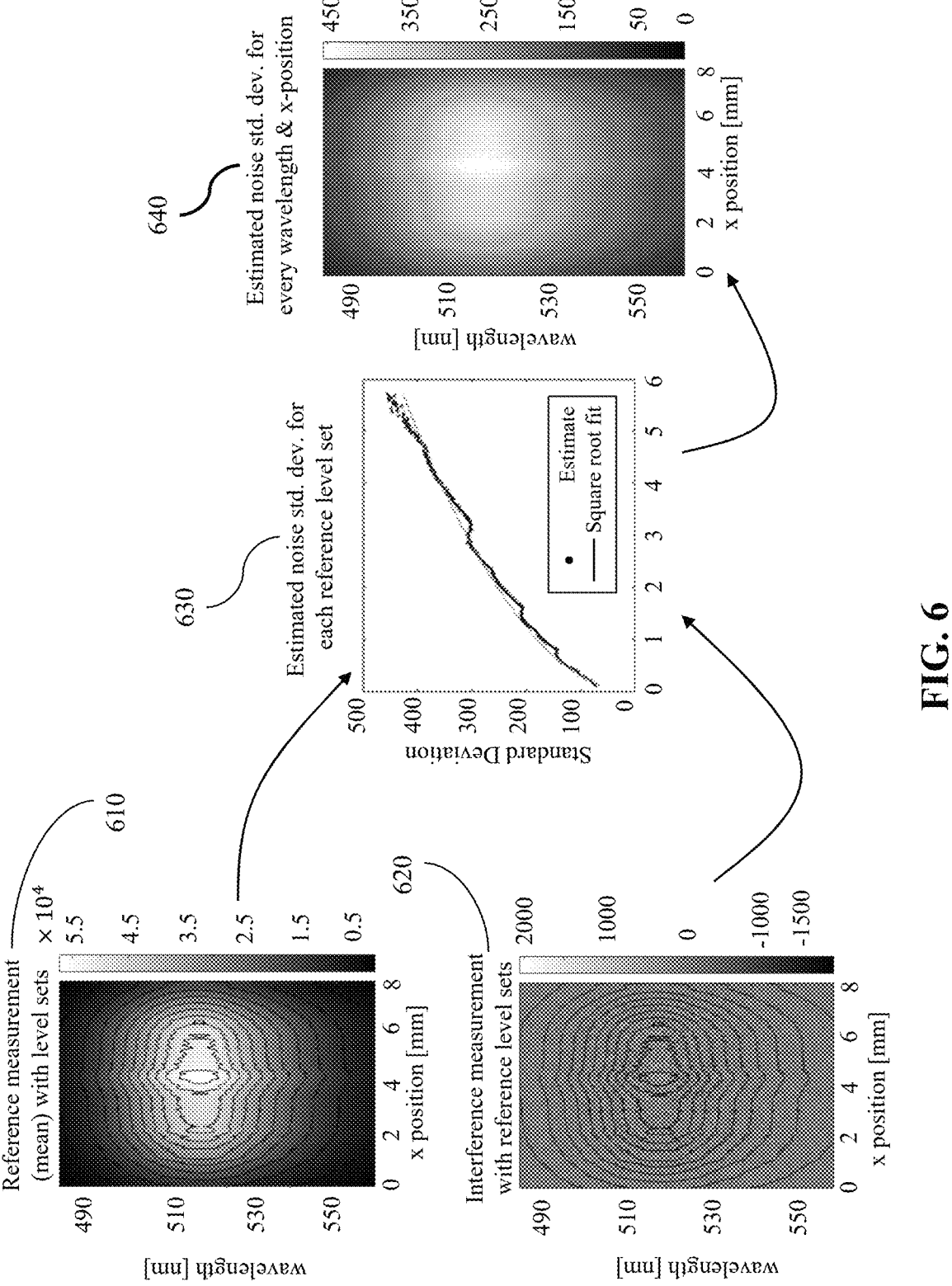
Figure 7:
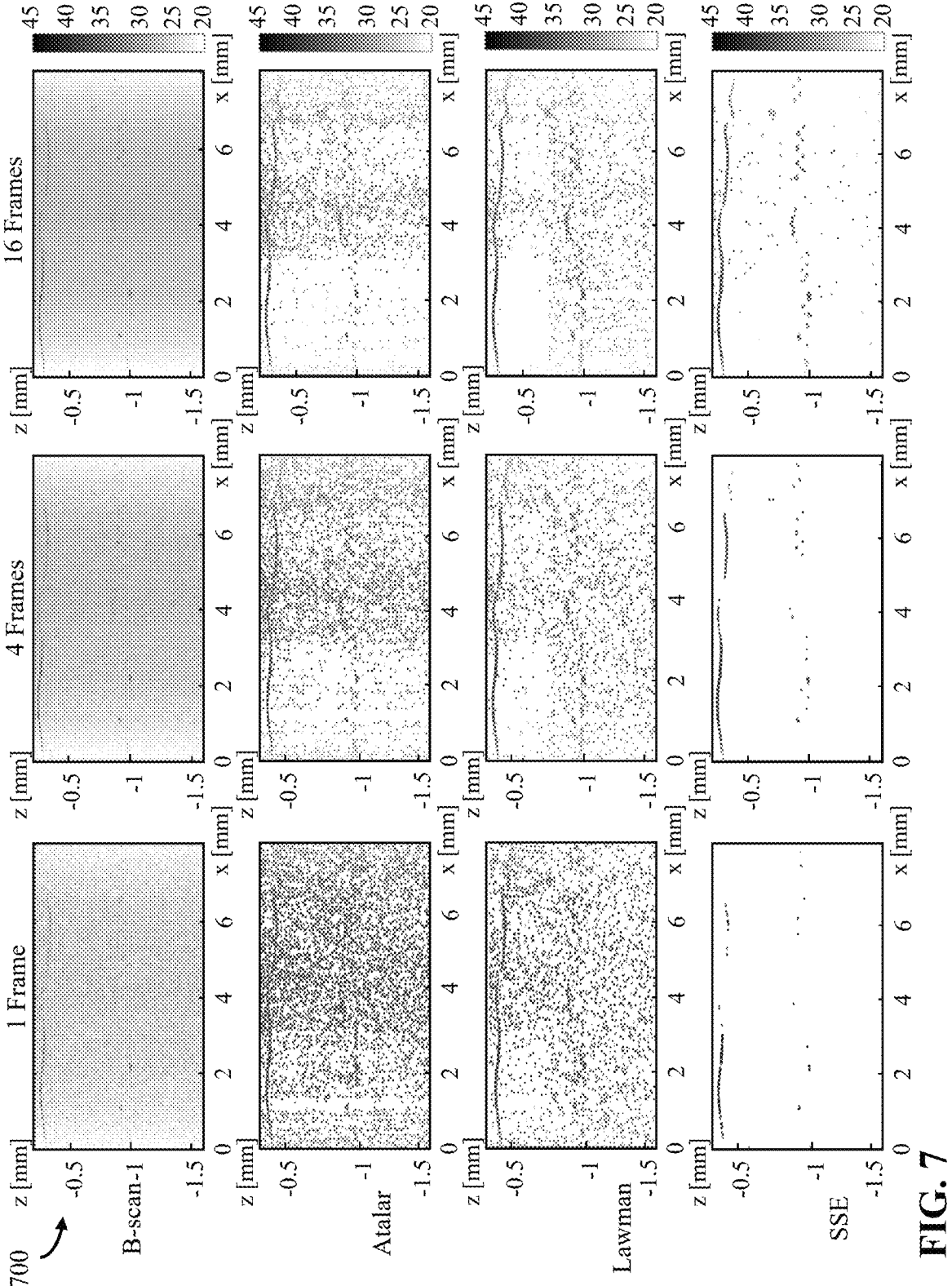
Figure 8A:
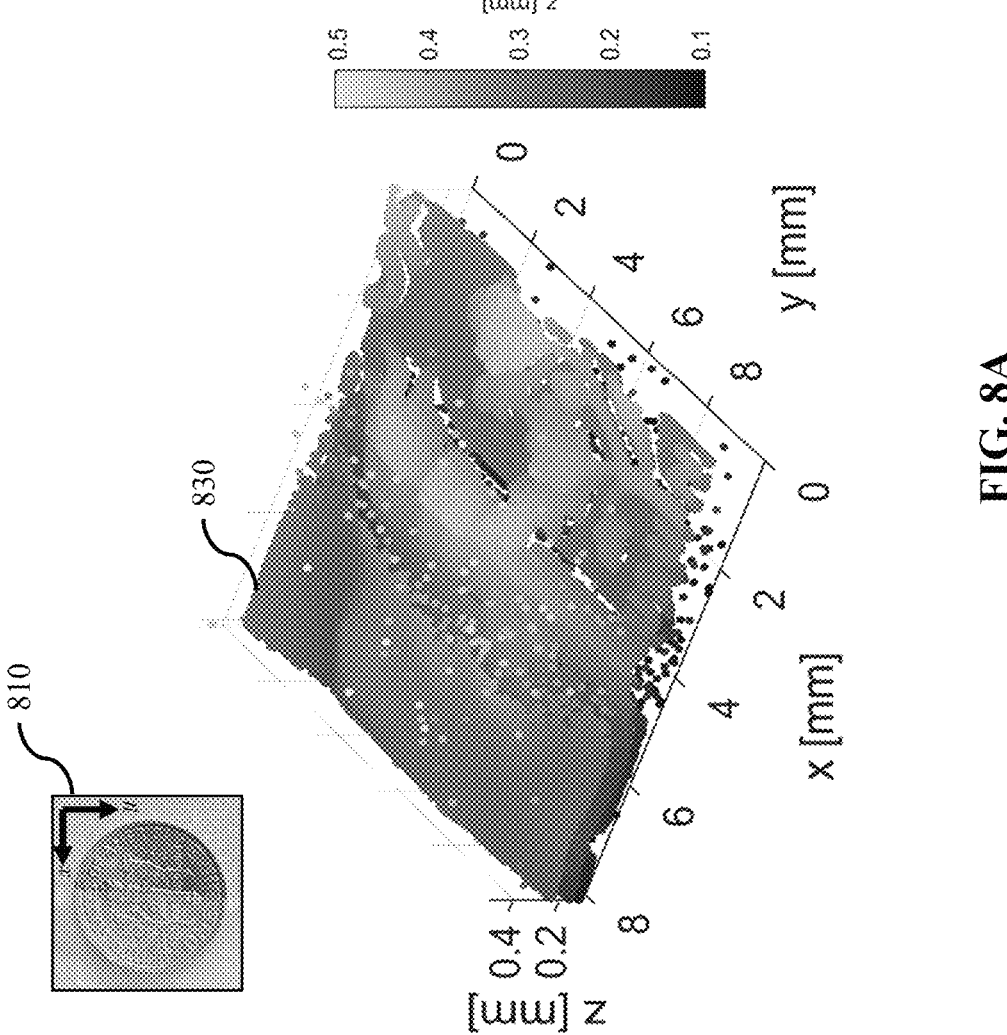
Figure 8B:
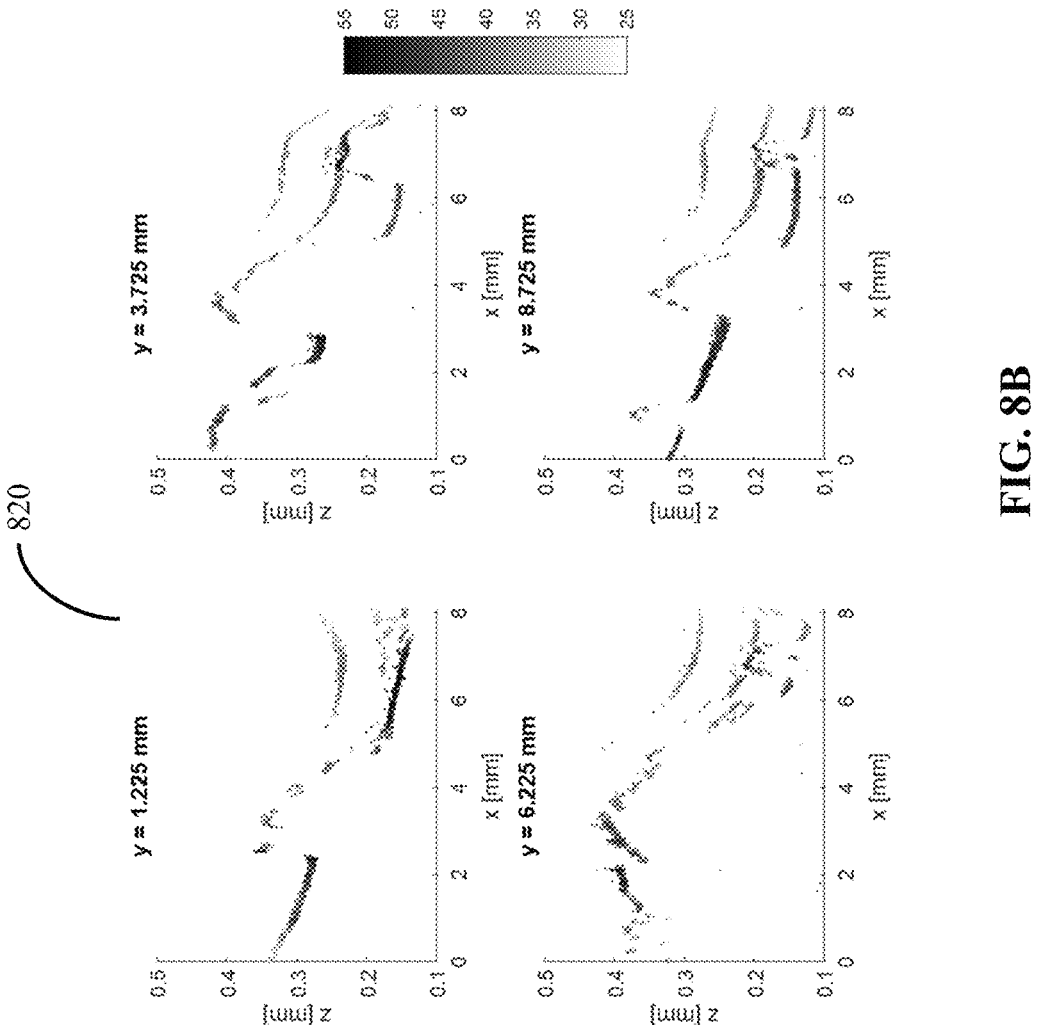
Figure 8C:
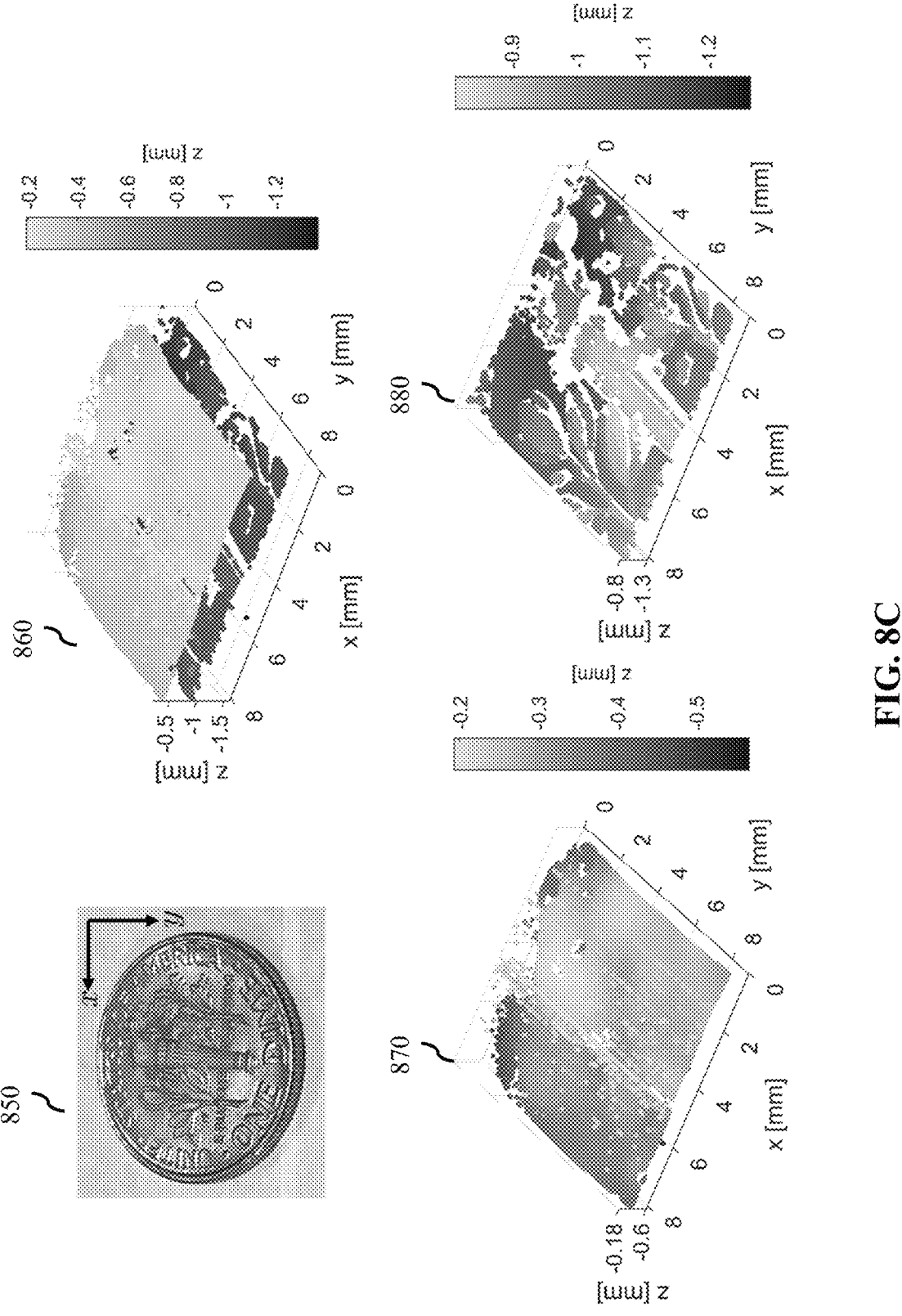
Figure 9:
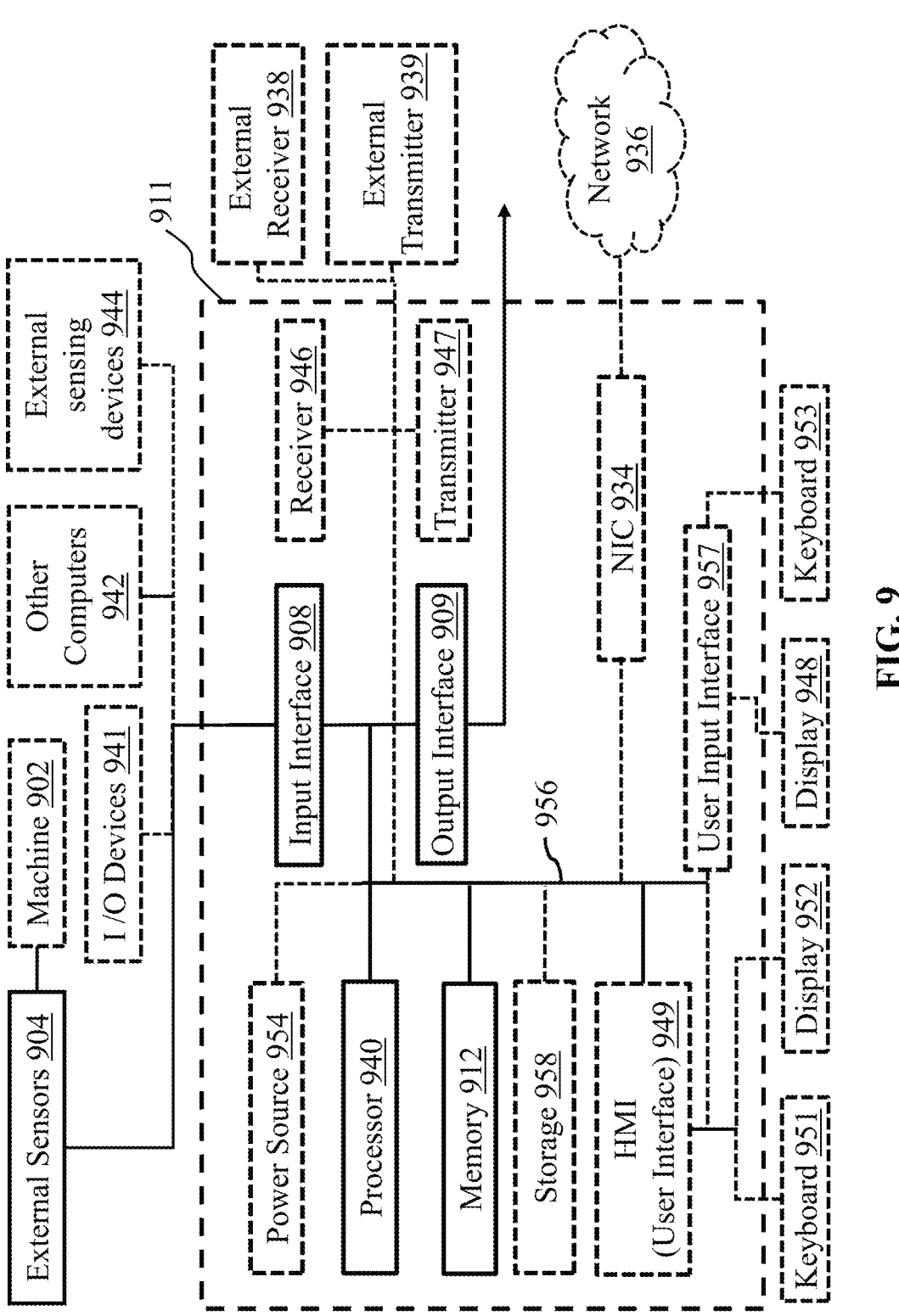

FIG. 3C illustrates one exemplar structure of a measurement matrix utilized for determining the maximum likelihood estimator (MLE) for the depth of the specimen surface, according to some example embodiments;

FIG. 3D illustrates the process of determining the maximum likelihood estimator (MLE) for the depth of the specimen surface via refinement of the back-projection estimate, according to some example embodiments;

FIG. 4 shows an example of the noise distribution and associated reflection power threshold changing with the number of measurement frames, according to some example embodiments;

FIG. 5 illustrates the capture of a reference-only measurement, used in part for noise calibration, according to some example embodiments;

FIG. 6 illustrates a noise calibration method using level sets of the reference-only measurement to identify pixels with equal variance, according to some example embodiments;

FIG. 7 shows experimental results using the proposed processing, which isolates the surface profiles with far fewer spurious detections than existing methods, according to some example embodiments;

FIGS. 8A and 8B illustrate experimental results for OCT surface recovery for a coin that is partially covered by adhesive tape;

FIG. 8C illustrates experimental results for OCT surface recovery for a coin that is completely covered by dried glue; and FIG. 9 illustrates a block diagram of a system for implementing an OCT system, according to some example embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, similar reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Several applications in physics require precise microscopic measurements of surface structure. Some non-limiting examples of such applications include quality assurance in manufacturing, photolithography, chip assembly, etc. Non-contact optical measurement systems are desirable, particularly those that can be integrated directly into the manufacturing hardware (i.e., in-line measurements). One example scenario is CNC-controlled electric discharge machines (EDMs).

In order to measure the surface profile of a material surface, a quantified measurement of the material surface is required. This may be done by profilometry, in which a probe, mechanical (contact) or optical (noncontact), is passed across the surface. The probe follows the contours at each point on the surface, and the height of the probe at each point is recorded and the resulting one-dimensional (1D) scan or a two-dimensional (2D) map is analyzed. Parameters such as arithmetic average of the absolute values of all points of the profile (Ra), root means square values of all the heights around the mean (Rq) are often used to quantify the roughness. Profilometers generate an image of the surface height. Size of the area measured, and the size of the probe set the upper and lower limits on the size of the features that can be characterized. The nature of the probe limits the range of surfaces that can be investigated by these techniques. In this regard optical techniques are more appropriate for relatively soft materials.

Optical profilometry is a more recent and modern approach and has been developed to increase accuracy. Briefly, a source of light is used to scan the sample surface and the light beam diffracted by the surface roughness is collected on a mirror. The image generated is the deviation of the light beam on the mirror. With this technique, it is possible theoretically to assess the roughness as low as a nanometer.

Optical profilometry is a rapid, non-destructive, and non-contact surface metrology technique. An optical profiler is a type of microscope in which light from a lamp is split into two paths by a beam splitter. One path directs the light onto the surface under test, the other path directs the light to a reference mirror. Reflections from the two surfaces are recombined and projected onto an array detector. When the path difference between the recombined beams is on the order of a few wavelengths of light or less interference can occur. This interference contains information about the surface contours of the test surface. Vertical resolution can be in the order of several angstroms while lateral resolution depends upon the objective and is typically in the range of few microns.

In many applications, electromagnetic sensing is used for profilometry measurements to obtain information about the surface or sub-surface of a particular specimen. One such technique is tomography. Some types of tomography include, for example, optical coherence tomography (OCT), x-ray tomography, positron emission tomography, optical projection tomography, and the like. Estimating the depths of multiple reflective, semi-transparent surfaces has applications in a wide array of scenarios ranging from paint thickness inspection in art conservation or automotive settings, optical component manufacturing of lenses, liquid crystal displays, or the like, measuring the thickness of silicon wafers or semiconductors, and monitoring metal etching in electric discharge or other numerical control machine. Technologies like OCT are attractive for such applications because it can achieve very high resolution over sufficient specimen thickness.

OCT is a technology used to perform high-resolution cross-sectional imaging. It is often applied to imaging biological tissue structures, such as the human eye, for example, on microscopic scales in real time. Optical waves are reflected from an object or sample and a computer produces images of cross sections or three-dimensional volume renderings of the sample by using information on how the waves are changed upon reflection. While OCT is a well-established technique for volumetric imaging of semi-transparent media, OCT can also be used for reconstruction of a discrete set of surfaces with far greater precision than the classical axial resolution.

OCT may be performed based on time-domain processing (time-domain OCT or TD-OCT) or Fourier-domain processing (Fourier-domain OCT or FD-OCT). The problem of estimating the depth profile of a single opaque reflector via FD-OCT is straightforward. In FD-OCT, the measurement is a sinusoid whose beat frequency is proportional to the depth of the reflector. Depth estimation thus entails finding the frequency with the largest energy in the measurement.

Based on the measurement model for OCT, each layer in the sample will cause a peak in the spectrum of the interference measurement. Noise will also sometimes cause a peak in the spectrum. The challenge is to determine whether a peak is due to signal or noise. A common way to distinguish whether a peak is due to signal or noise is to set a threshold. Above that threshold, the peak is likely due to signal. Below that threshold, the peak is likely noise. Various example embodiments described herein address the question of how to set the threshold, especially when the amplitude for signal peaks is not known in advance.

Figure 1A:
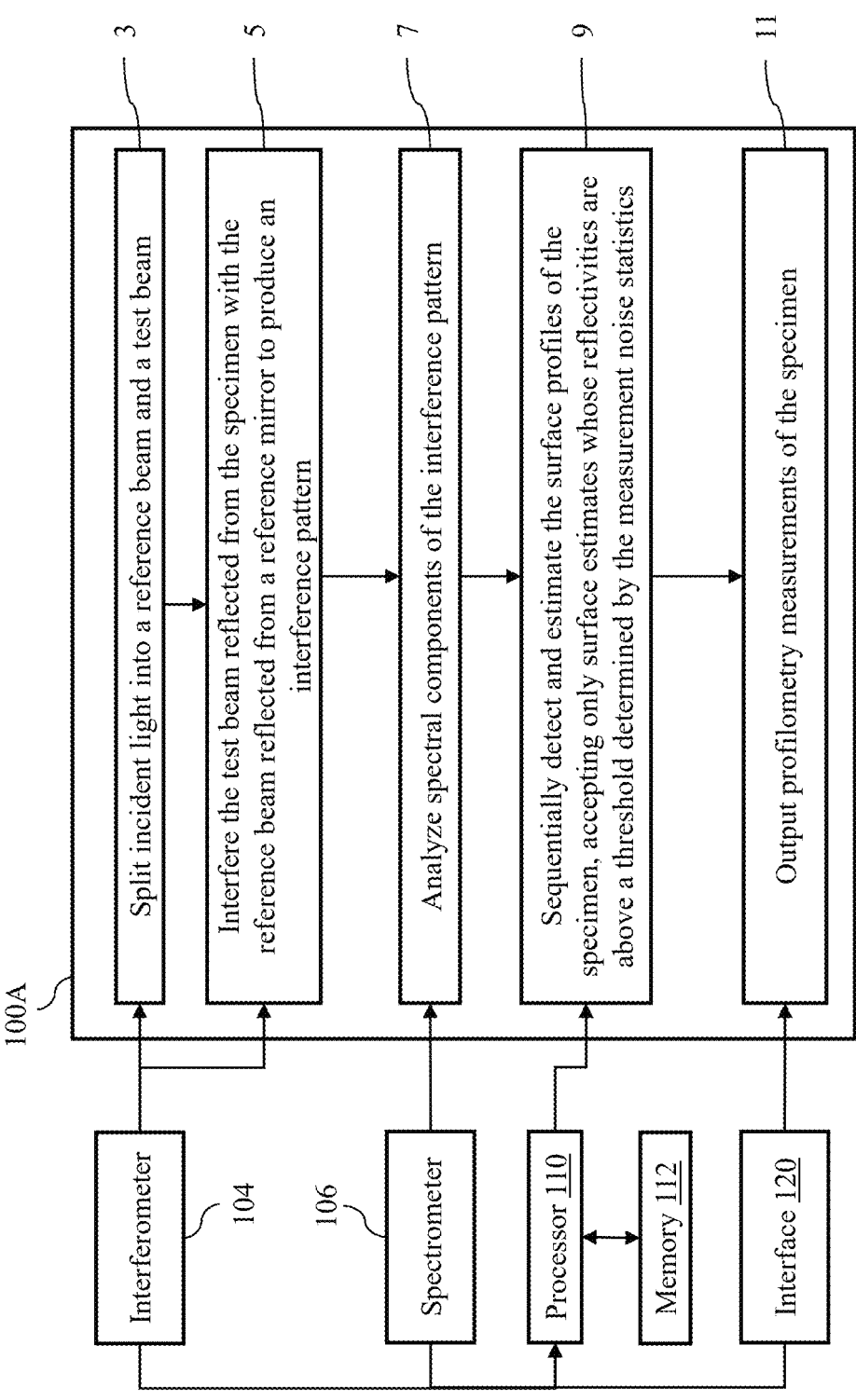
FIG. 1A illustrates a method for profilometry measurements of a specimen in an Optical Coherence Tomography (OCT) system, according to some example embodiments.

FIG. 1A illustrates a method 100A for profilometry measurements of a specimen in an OCT system, according to some example embodiments. The method 100A may be executed by some or all components of an OCT system which is described later in detail with reference to FIG. 1B. The profilometry measurement method 100A comprises splitting 3 an incident light beam into a reference beam and a test beam. This may be performed by an interferometer 104 of the OCT system. According to some example embodiments, in this regard a beamsplitter may be utilized. At step 5, the method 100A comprises interfering the test beam reflected from the specimen with the reference beam reflected from a reference mirror to produce an interference pattern. In this regard, the interferometer 104 may capture a reflection of the test beam reflected from the specimen and a reflection of the reference beam reflected from the reference mirror. The interferometer 104 may then interfere 5 the reflections of the test beam and the reference beam to produce the interference pattern.

At step 7, the method comprises analyzing spectral components of the interference pattern. The processor 110 of the OCT system utilizes a computer readable memory 112 and sequentially detects and estimates 9 the surface profiles of the specimen, accepting only surface estimates whose reflectivities are above a threshold determined by the measurement of noise statistics. The profilometry measurements thus determined by the processor 110 may be output 11 via an interface 120 of the OCT system which may be rendered on a suitable interface or transmitted to another system for further processing.

One or more components such as the interferometer 104, the spectrometer 106, the interface 120 and/or the memory 112 may be communicatively coupled to the processor 110. The processor 110 may additionally be coupled to one or more additional processing circuitry to perform additional processing. The processor 110 may perform one or more operations such as communicate, read/write and/or control operations of the above mentioned one or more components. The profilometry measurement method comprises several modules which will be explained hereinafter in detail. Firstly, an overview of the OCT system is provided with reference to FIGS. 1B and 1C to understand the components and elements utilized to realize the OCT system.

Figure 1B:
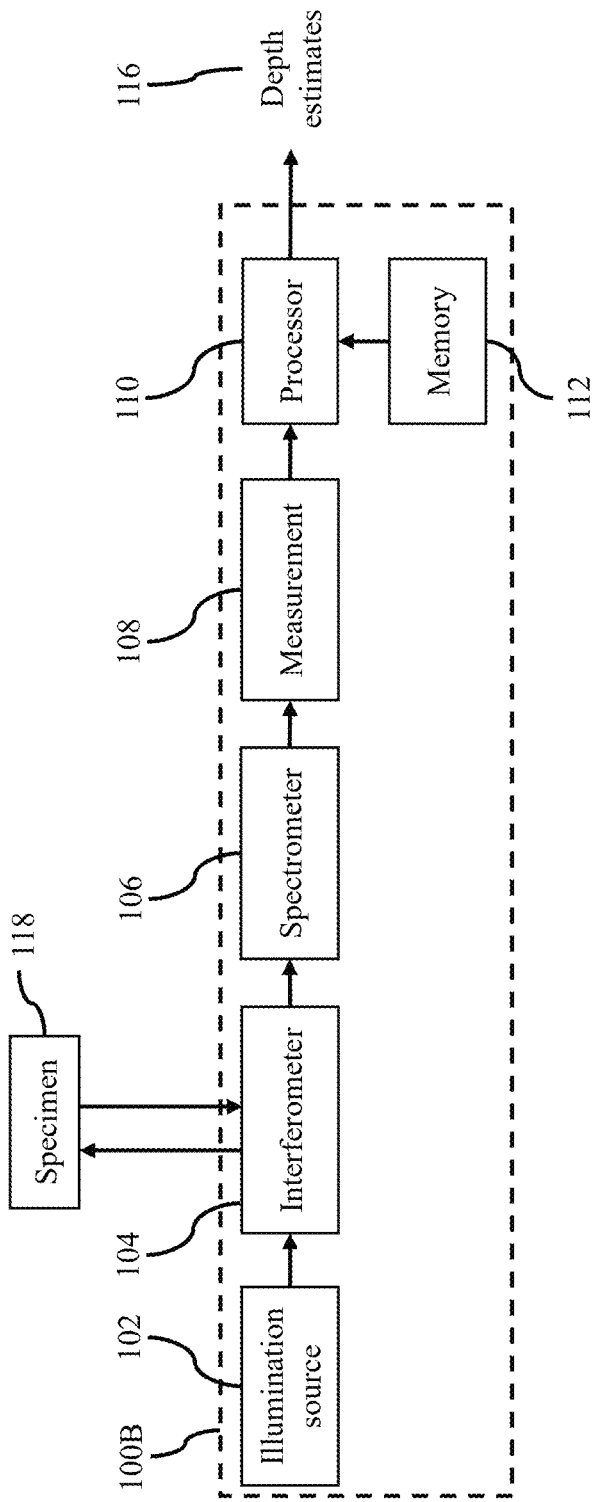
FIG. 1B shows a schematic of an OCT system for producing profilometry measurements of a specimen, according to some example embodiments.

FIG. 1B illustrates a schematic of an OCT system 100B that produces depth estimates 116 of the layers of a specimen 118 from a measurement 108. The OCT system 100B comprises an illumination source 102 (for example a suitable light source), an interferometer 104, a spectrometer 106, a processor 110, and memory 112. In some example embodiments, the specimen 118 may have at least one reflecting surface.

The illumination source 102 may comprise any suitable source of illumination that provides a light beam or an electromagnetic beam for investigating the specimen 118. The choice of the illumination source may be dependent on the subject specimen 118 and/or the intended application of the OCT system. For example, without limitation the illumination source 102 may comprise one or more of a tunable LASER, an LED array, an incandescent source, a noble gas-based lamp, or the like. According to some example embodiments, the illumination source 102 includes one or a combination of a laser, a superluminescent diode (SLD), or a light-emitting diode (LED).

In some example embodiments, the illumination source 102 may be configured to utilize planar geometry, fan-beam geometry, pointwise illumination, or any combination thereof. Pointwise illumination may be provided by any beam steering mirror-like devices such as electromechanical, opto-electronic, acousto-optic, all optical-based technology, liquid-crystal-based mirror, and any other such devices.

A beam originating from the illumination source 102 may comprise light with coaxial, orthogonal polarizations and/or with different optical frequencies. The beam is split by a beam splitter of the interferometer 104 into a reference beam and a test beam. In some example embodiments, the interferometer 104 may be a Michelson interferometer, a Linnik interferometer, a Mach-Zehnder interferometer, or any other such device. According to some example embodiments, the beam splitter of the interferometer 104 may be a partially reflecting mirror. In some example embodiments, the beam splitter may be a non-polarizing beam splitter. The beam splitter may split the beam into a reference illumination that is transmitted to the reference mirror and a sample illumination that is transmitted to the specimen 118.

According to some example embodiments, the beam splitter may comprise a series of beam splitters and/or polarizers. The incident beam from the illumination source 102 is split by the beam splitter of the interferometer 104 into a test beam (sample illumination) for illuminating the specimen 118 and a reference beam (reference illumination) that is transmitted towards a reference mirror. The sample illumination or test beam is incident on the specimen 118 and all or a portion of the sample illumination may be reflected from the specimen 118 towards the beam splitter. The reflected signal from the specimen 118 may be further split by the beam splitter and at least a part thereof gets combined with the reflected reference illumination and is directed towards the detector array of the spectrometer 106 for further analysis and detection. The detector array of the spectrometer 106 may comprise suitable image capturing devices such as a charge coupled device. The detector array may provide one or more detection signals corresponding to a recombination of the reflected test beam and the reflected reference beam.

The sample illumination may include an electromagnetic two-dimensional (2D) field directed by the interferometer 104 to form an axial scan of the specimen 118, such that the measured intensities of interference pattern include measurements corresponding to a sequence of points on a line of the specimen 118. In some example embodiments, the OCT system 100B may also include one or more actuators for directing the incident light into another line parallel to a line of a previous scan.

The processor 110 may extract a sequence of intensities corresponding to the sequence of points on the line of the specimen 118. Additionally, the processor 110 may process the intensities of different points concurrently with each, to produce the profilometry measurements for the sequence of points. In some example embodiments, the OCT system 100B may comprise or be additionally coupled to one or more processing circuitry for producing in parallel, the profilometry measurements for at least some points in the sequence of points. The one or more processing circuitry may comprise suitable processing means such as processors and memories.

According to some example embodiments, the OCT system 100B may additionally comprise a line-field generator including an extended light source of an angular size greater than a lateral resolution across the profilometry measurements, a lens arranged on a path of light emitted by the extended light source for focusing the light into an extended line-field light of a width greater than the lateral resolution, and a filter arranged in a focal plane of the lens for spatially filtering the extended line-field light into the incident light with a line-field of a width equal to the lateral resolution.

Figure 1C:
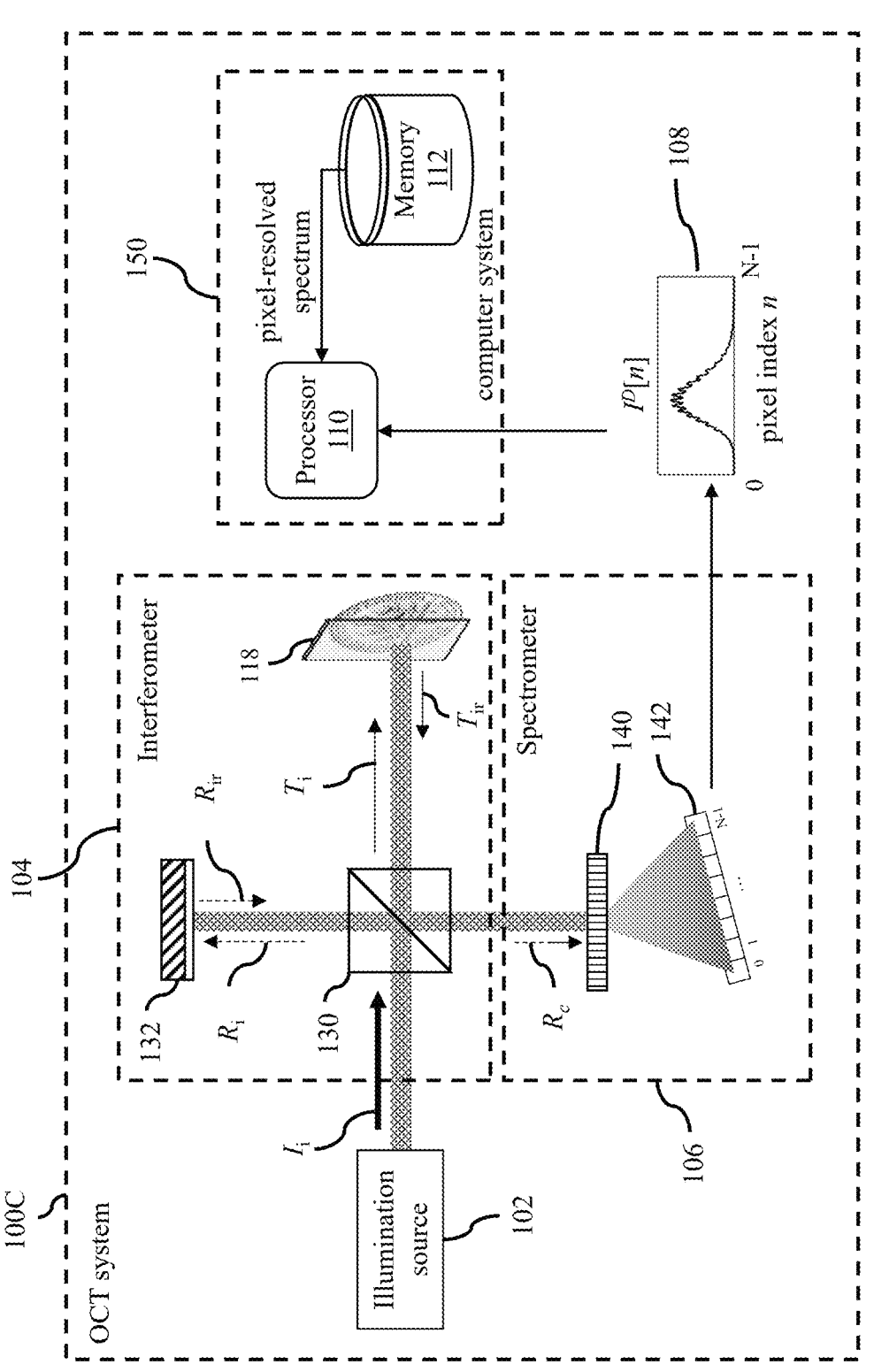
FIG. 1C shows a detailed schematic of the OCT system for producing profilometry measurements of a specimen, according to some example embodiments.

FIG. 1C illustrates a detailed schematic of a spectral-domain (SD) OCT system 100C, according to some example embodiments. Illumination source 102 may be a broadband source and may emit a polychromatic plane wave. The beamsplitter 130 splits the incident illumination $I_i$ into the two arms of the interferometer 104. That is, the beam splitter 130 may split the incident beam $I_i$ into a reference beam $R_i$ and a test beam $T_i$. The reference beam $R_i$ gets transmitted towards the reference mirror 132 while the test beam $T_i$ gets transmitted towards the specimen 118. At least a portion of the reference beam $R_i$ and the test beam $T_i$ are reflected from the reference mirror 132 and the multi-layered specimen 118, respectively in the sample arm and arrive at the beam splitter 130 as reflected reference beam $R_{ir}$ and reflected test beam $T_{ir}$, respectively. The reflected components $R_{ir}$ and $T_{ir}$ in the sample arm of the interferometer 104 are recombined by the beam-splitter 130 to produce the interference pattern as a recombined illumination $R_c$.

The spectrometer 106 has a diffraction grating 140 that separates the interference intensity by wavelength. According to some example embodiments, the diffraction grating 140 diffracts different beams of different wavelengths forming the interference pattern into different diffraction angles. The intensity of the combined light is measured with array detector 142, with each detector pixel indexed $n=0,\ldots,N-1$ measuring a separate wavelength $\lambda_n$. The corresponding wavenumber is defined as $k_n=2\pi/\lambda_n$, and the Power Spectral Density (PSD) at that wavenumber is $S(k_n)$. The detector array 142 may have detecting elements arranged at the different diffraction angles to measure intensities of different beams corresponding to the intensities of the uniformly sampled wavelengths in the interference pattern. The detecting elements of the detector array 142 may be calibrated to map each index of the detecting elements in the detector array with a corresponding wavelength.

For specimen 118 consisting of L discrete reflecting layers, the linearized intensity (ignoring autocorrelation terms) measured at pixel n in detector array 142 is the measurement 108 given by:

$$I^D[n] \propto S(k_n)\left\{\sum_{\ell=0}^{L} a_\ell^2 + 2\sum_{\ell=1}^{L} a_\ell \cos[2k_n(z_\ell - z_R) + \phi_\ell]\right\} + v[n],$$

where the reference arm distance is $z_R$ with normalized reflectivity $\alpha_R=\alpha_0=1$, each sample arm optical path length is $z_\ell$ with relative reflectivity $a_\ell$, $\phi_\ell$ is a phase offset that can occur due to vibration during the measurements, and noise $v[n]$ is assumed to be zero-mean and Gaussian.

The steps of preprocessing and depth estimation may be performed by the processor 110 of the computer system 150. The DC components are removed from the depth measurement 108. In some example embodiments, the DC components may be removed by applying a high-pass filter to the raw measurements.

Figure 1D:
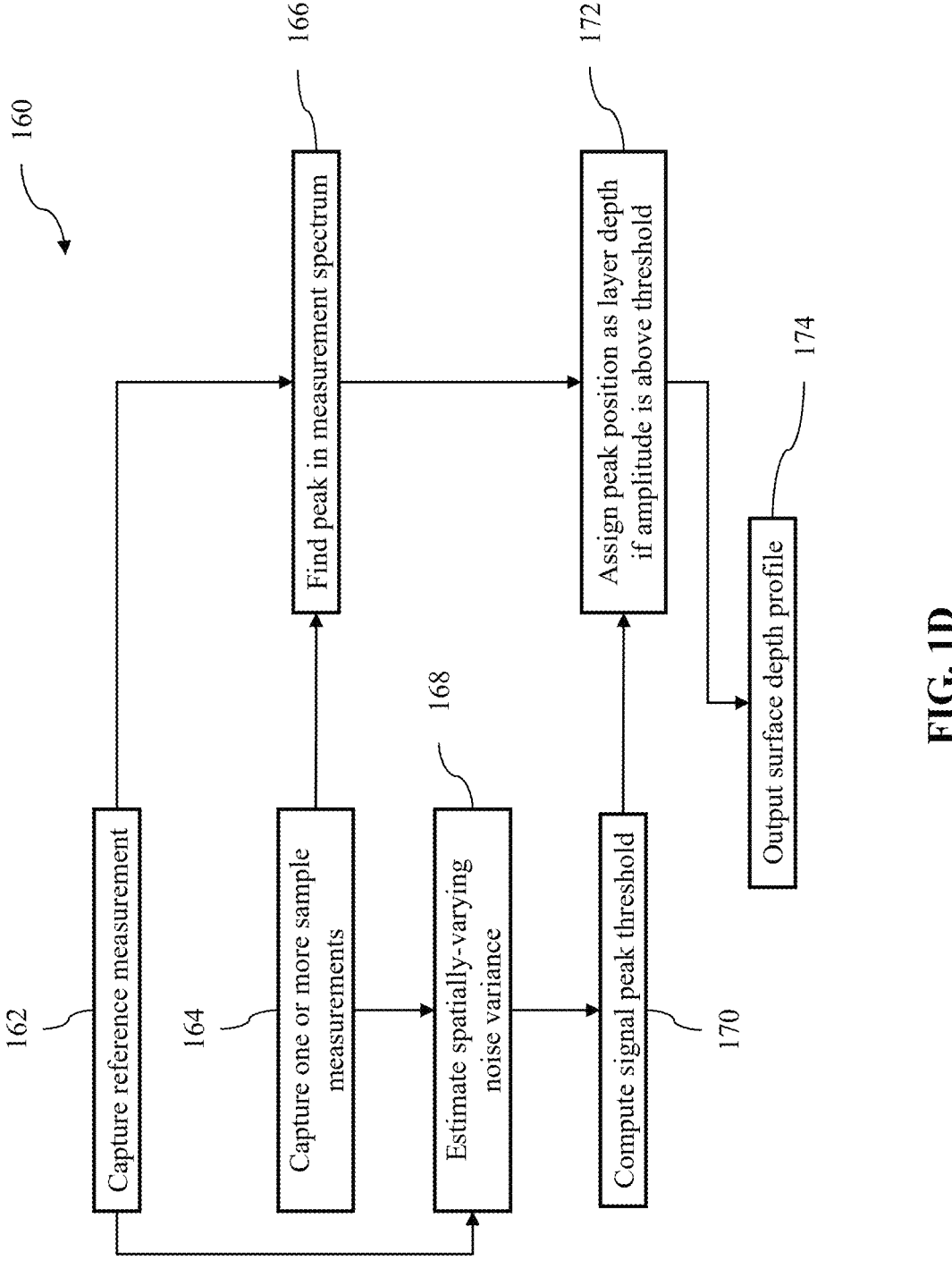
FIG. 1D illustrates a method for generating surface depth profile of a specimen, according to some example embodiments.

FIG. 1D illustrates a method 160 for generating surface depth profile of a specimen, according to some example embodiments. Particularly, FIG. 1D describes the steps performed for estimating the depth measurements 108 of FIG. 1C in detail. Method 160 may be executed by the computer system 150 of the OCT system 100C of FIG. 1C. The reference measurement is captured 162 from the detector array 142. One or more sample measurements are also captured 164 from the detector array 142 as a reflection of the test beam from the specimen 118. Using the reference and sample measurements, the peak in the measurement spectrum of the interference pattern of the reference and sample measurements is determined 166. Also, using reference and sample measurements, the computer system 150 estimates 168 spatially varying noise variance of the spectrum of the interference pattern of the reference and sample measurements. Subsequently, a signal peak threshold based on a fixed probability of false alarm for distinguishing between signal and noise peaks is computed 170 from the spatially varying noise variance estimate. Details of the noise variance estimation and threshold computation are described later in this disclosure. At step 172, the method 160 comprises assigning 172 peak position as layer depth if the corresponding amplitude is above the signal peak threshold. Step 172 is executed for each peak determined at step 166. The assigned peak positions at step 172 are output 174 as the surface depth profile of the specimen 118.

Sequential Surface Estimation

Figure 2:
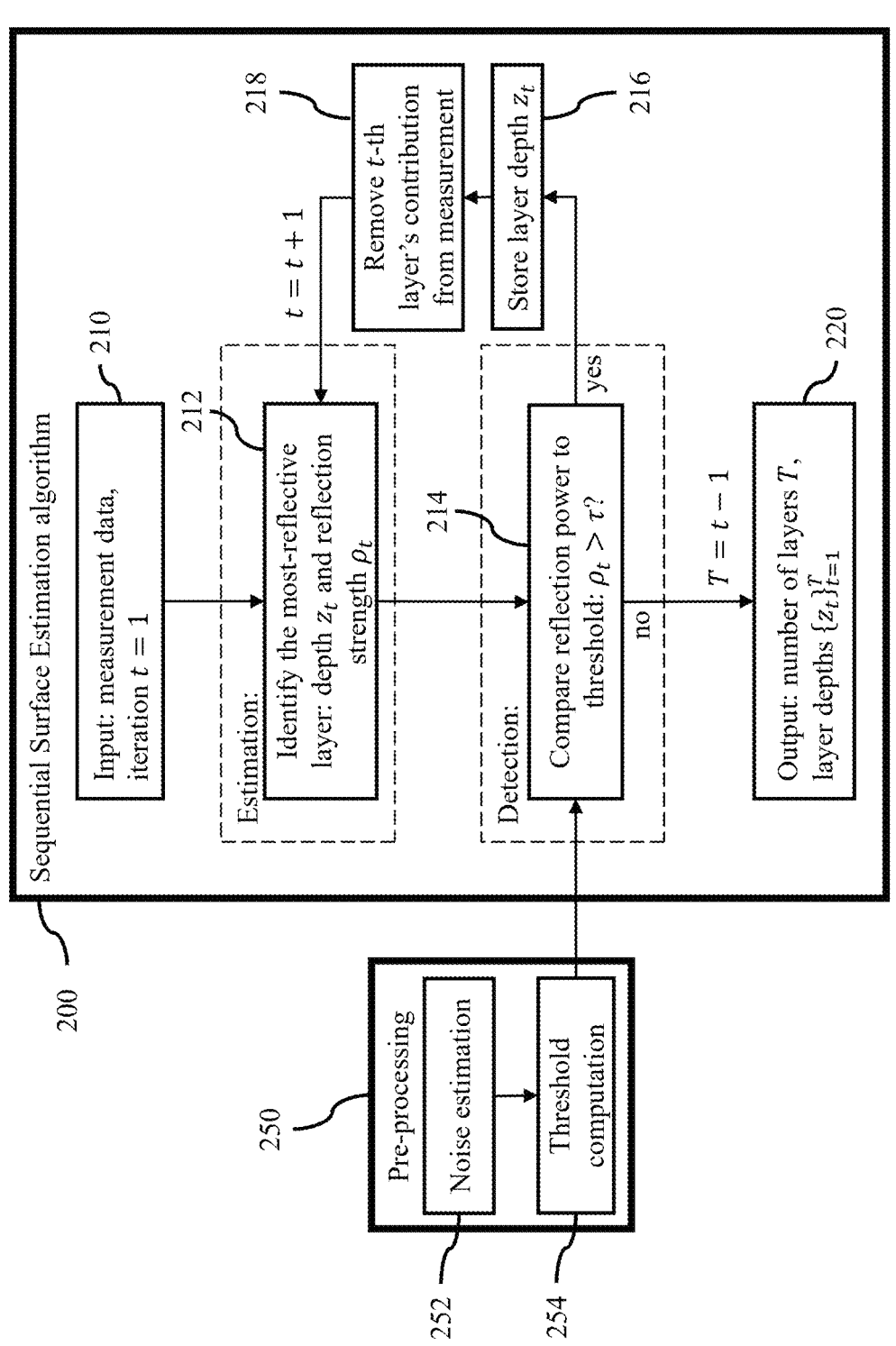
FIG. 2 illustrates a process of sequentially estimating and detecting surfaces using a threshold determined by measurement of noise statistics, according to some example embodiments.

FIG. 2 depicts a process of multi-layered reconstruction via a Sequential Surface Estimation (SSE) algorithm 200 for determining the number and depths of the specimen surface 220. The process takes the measurement data 210 as input as well as a threshold determined via pre-processing 250. It may be contemplated that within the scope of the disclosure, the preprocessing 250 may precede the execution of the SSE algorithm 200 at run time. The preprocessing 250 comprises the subprocesses of i.) noise estimation 252 for the spectrum of the interference pattern produced by the reference and sample measurements and ii.) computation 254 of the signal peak threshold $\tau$ for distinguishing between signal and noise peaks.

For a single opaque layer, i.e., L=1, the estimate of z is well defined as a search for the beat frequency with the largest energy in the OCT measurement. For L>1, estimating the set of layer depths is not as straightforward to compute. Because the number of layers Lis often unknown, the problem becomes that of joint detection and estimation. More specifically, for any hypothetical layer, a reconstruction algorithm must not only determine the layer depth but also determine whether the layer actually exists, or whether it is an artifact of noise. This is especially important for mission critical applications, for example in the field of medical procedures, where the layer depth should actually be that of a true layer and not of an artifact of noise. The process of multi-layered reconstruction via the SSE algorithm 200 is configured with these facts into consideration.

The iterative algorithm 200 starts at step 210 with iteration number t=1 where measurement data (reference and sample measurements) is taken as input. The algorithm 200 alternates between estimation 212 and detection 214. First, surface estimation 212 is performed by identifying the most-reflective layer i.e., searching for the frequency with the highest energy in the OCT measurement. This is equivalent to finding the depth $z_t$ and reflection power $\rho_t$ of the t-th most reflective component. Secondly, a detection step is performed. The reflection power $\rho_t$ is estimated and compared 214 to the pre-computed threshold $\tau$. Note that the reflection power $\rho_t$ is related to the physical reflectivity parameter $\alpha_t$. According to some example embodiments, the reflection power may be defined with a squared-magnitude operation that is more conducive to statistical analysis for determining the threshold $\tau$.

If $\rho_t>\tau$ i.e., the outcome of step 214 is yes, the layer depth estimate is assumed to be a true reflection, accordingly, the layer depth $z_t$ is stored 216, and subsequently the signal component for the layer at $z_t$ is removed 218 from the measurement 210. The iteration counter is incremented as t=t+1, and the sequence of sub-processes 212-218 is repeated until a termination condition is met. However, if $\rho_t<\tau$, i.e., the outcome of step 214 is no, the layer depth estimate is considered to be spurious due to noise, and the estimation procedure is stopped. Then the output 220 is all T=t−1 previously accepted layers at depths $$\{Z_t\}_{t=1}^{T}.$$

The output comprises number of layers given as T=t−1 and the layer depths of those layers given by $$\{Z_t\}_{t=1}^T.$$

The key challenge for the sequential surface estimation algorithm 200 is determining how to set the threshold τ. Two pre-processing steps 252 and 254 are used to precisely set the threshold. The first step 252 is to compute the noise statistics. Conventional modelling assumes additive, white, zero-mean Gaussian noise, but the actual noise distribution may deviate from that assumption. Secondly, the threshold is computed 254 so that-if the entire measurement were due to noise—the probability of accepting a false layer detection would be lower than some fixed probability of false acceptance value $p_{FA}$. Computing the threshold thus requires threshold computation to be closely related to the estimation procedure.

Estimation Procedure

The interference data can be extracted from the linear detector 142 intensity measurements in numerous ways. According to some example embodiments, this may be achieved using a low-pass filter to remove the DC components. According to some alternate embodiments, the interference data may be extracted as:

$$y = I^D - \langle I^D, S \rangle S,$$

where the angle brackets indicate an inner product between the detector intensity $I^D$ and the power spectral density S. After extraction, each element of the data vector is given as:

$$y_n = S(k_n) \sum_{\ell=1}^{L} a_\ell \cos(2k_n z_\ell + \phi_\ell) + w[n],$$

where $z_R$ is assumed to be zero, and w[n] is zero-mean Gaussian noise.

In some example embodiments, the estimation procedure 212 in FIG. 2 is the maximum likelihood estimator for a single opaque layer (i.e., L=1), as elaborated in FIG. 3A-3D.

FIG. 3A depicts a process 300 for determining the maximum likelihood estimate (MLE) 314 for the depth of the specimen surface 118, for input data terms. The input data terms include data vector 302 given by y=[y[0], . . . , y[N−1]]$^T$, wavenumber calibration 304 expressed as $k_n$, power spectral density calibration 306 expressed as $S(k_n)$, and a set of candidate depths 308 expressed as $z_m$ for evaluation. Assuming the noise is zero-mean, white, and Gaussian, the likelihood of observing data y is:

$$p(y; a, z, \phi) = \frac{1}{(2\pi\sigma_w^2)^{\frac{N}{2}}} \exp\left(-\frac{1}{2\sigma_w^2} \sum_{n=0}^{N-1} \{y[n] - S(k_n)a \cos(2k_n z + \phi)\}^2\right).$$

The maximum likelihood estimate depth is then the value of z that minimizes $$-\log p(y; a, z, \phi) = \sum_{n=0}^{N-1} \{y[n] - S(k_n)a \cos(2k_n z + \Phi)\}^2,$$

which ignores constant terms. Because the negative log-likelihood is highly multi-modal, according to some example embodiments, it is advantageous to perform the minimization in a two-step procedure of coarse 310 and fine 312 estimation yielding a coarse depth estimate $$\hat{z}_{coarse}^{ML}$$

and a fine depth estimate $$\hat{z}_{fine}^{ML},$$

respectively. In some example embodiments, the coarse estimation step 310 may be sufficient for the depth estimation 314 and in such case, the fine depth estimation step 312 may be optional. In some embodiments, the MLE 314 may be given as a depth estimate $\hat{z}^{ML}$ and reflectivity estimate $\hat{a}^{ML}$.

FIG. 3B depicts a detailed process leading to the coarse estimation step 310 of FIG. 3A, according to some example embodiments. For the coarse step, some embodiments recognize that a slowly varying PSD leads to the MLE being approximated by the value of z that maximizes $$G(z) = \frac{2}{Q}\left|\sum_{n=0}^{N-1} y_n S(k_n) \exp(-i\, 2k_n z)\right|^2.$$

The advantage of this approximation is that it can be evaluated efficiently at a discrete set of candidate depths via matrix-vector multiplication.

The discrete measurement matrix A is formed 320 such that the (n, m)$^{th}$ element of the matrix is given as $$[A]_{n,m} = S(k_n) \exp(i 2k_n z_m),$$

including the calibrated PSD $S(k_n)$ 306, calibrated wavenumbers $k_n$ 304, and a set of candidate depths $z_m$, (where m=0, . . . , M−1) 308. FIG. 3C illustrates one exemplar structure of the measurement matrix A formed at 320, according to some example embodiments. It may be contemplated that any matrix satisfying the aforementioned conditions on its elements may be chosen as the measurement matrix A.

Returning back to FIG. 3B, in order to perform the coarse maximum likelihood estimation 310, the data vector 302 is back projected 322 by the processor through measurement matrix 320 to yield f=A$^H$y, where the ($^H$) operator denotes the complex conjugate transpose. Alternatively, if A is the discrete Fourier transform or nonuniform discrete Fourier transform, the back-projection operation may be performed with matrix-free algorithms such as the fast Fourier transform (FFT) or nonuniform FFT (NUFFT).

The magnitude of the back-projection |f| is maximized 324 at index m̂, and the coarse estimate 326 is the corresponding candidate depth $$\hat{z}_{coarse}^{ML} = z_{\hat{m}}.$$

Furthermore, the reflectivity estimate is the scaled value of the maximum $$\hat{a}_{coarse}^{ML} = \frac{2}{Q}|f_{\hat{m}}|,$$

whereas the reflection power is defined to be $\rho = |f_{\hat{m}}|^2$. In many cases, the approximate, coarse estimate is sufficiently accurate. However, further accuracy may be achieved by maximizing $\Lambda(z)$ directly.

FIG. 3D depicts the process 312 of refining the coarse MLE $$\hat{z}_{coarse}^{ML}.$$

For a given depth z, the cosine and sine column vectors c and s are defined 340 to have the $n^{th}$ element $c_n = S(k_n)\cos(2 k_n z)$ and $s_n = S(k_n)\sin(2 k_n z)$. Then the objective function $\Lambda(z)$ may be computed 342 as $$\Lambda(z) = \frac{(s^T s)(c^T y)^2 - 2(s^T y)(c^T s)(c^T y) + (c^T c)(s^T y)^2}{(c^T c)(s^T s) - (c^T s)^2}.$$

The exact depth MLE, which minimizes the negative log-likelihood, is the value of z for which $\Lambda(z)$ is maximized, i.e., $$\hat{z}^{ML} = \arg\max_z \Lambda(z).$$

It may be contemplated that a slowly varying PSD leads to the approximations $c^T s = s^T c \approx 0$ and $c^T c \approx s^T s \approx Q/2$, where $$Q = \sum_{n=0}^{N-1} S^2(k_n),$$

so $\Lambda(z) \approx G(z)$, and the coarse estimate is typically close to the true depth value. Thus, $$\hat{z}_{coarse}^{ML}$$

is a good initial estimate, which can be further refined by maximizing the exact objective function $\Lambda(z)$ using a gradient-free optimization method such as Brent's minimization method or golden section search to produce a refined, continuous-valued depth estimate 344:

$$\hat{z}_{fine}^{ML} = \arg\max_z \Lambda(z).$$

The reflectivity may be determined similarly. Let the cosine and sine column vectors $\hat{c}$ and $\hat{s}$ be defined to have the $n^{th}$ element $\hat{c}n = S(k_n)\cos(2 k_n \hat{z}^{ML})$ and $\hat{s}n = S(k_n)\sin(2 k_n \hat{z}^{ML})$. The maximum likelihood reflectivity estimate 346 is $$\hat{a}^{ML} = \frac{\sqrt{((\hat{s}^T \hat{s})\hat{c}^T y - (\hat{c}^T \hat{s})\hat{s}^T y)^2 + ((\hat{c}^T \hat{c})\hat{s}^T y - (\hat{c}^T \hat{s})\hat{c}^T y)^2}}{(\hat{c}^T \hat{c})(\hat{s}^T \hat{s}) - (\hat{c}^T \hat{s})^2},$$

which with the same approximations simplifies to $$\hat{a}^{ML} \approx \frac{2}{Q}\sqrt{(\hat{c}^T y)^2 + (\hat{s}^T y)^2} = \frac{2}{Q}\left|\sum_{n=0}^{N-1} y_n S(k_n)\exp(-i\,2k_n \hat{z}^{ML})\right|,$$

and the reflection power is $$\rho = \left|\sum_{n=0}^{N-1} y_n S(k_n)\exp(-i2k_n \hat{z}^{ML})\right|^2.$$

If the signal to noise ratio (SNR) is low, the back-projection of a single measurement may be corrupted by noise and unreliable. There are several ways to increase the SNR, such as increasing the illumination power or increasing the effective measurement time. One way to increase the measurement time is to combine multiple measurements of the same specimen, effectively averaging out some of the noise while boosting the true signal. The multiple measurements could be independent snapshots of the same part of the specimen, or they could be measurements of the specimen with similar properties, such as those from nearby locations.

Suppose there are $N_F$ measurement frames to be combined. Then the depth estimate is the depth position with the largest total reflectivity across all frames. Specifically, the depth estimate for the measurements $y^{(f)}$, f=1, . . . , $N_F$ is modified to be $$\hat{m} = \arg\max_m \sum_{f=1}^{N_F} |A^H y^{(f)}|^2, \quad \hat{z}^{BP} = z_{\hat{m}},$$

the average reflectivity is $$\hat{a}^{BP} = \frac{2}{QN_F}\sum_{f=1}^{N_F}\left|\sum_{n=0}^{N-1} y_n^{(f)} S(k_n)\exp(-i2k_n \hat{z}^{BP})\right|,$$

and the reflection power is $$\rho = \prod_{f=1}^{N_F}\left|\sum_{n=0}^{N-1} y_n^{(f)} S(k_n)\exp\left(-i2k_n \hat{z}^{BP}\right)\right|^2.$$

Threshold Computation

Rather than unconditionally accepting a surface estimate, the detection step 214 of FIG. 2 aims to first determine whether the peak is truly the result of a surface reflection or if it is an artifact of the random noise. If the peak is determined to be due to signal (a surface reflection), the position estimate is retained; otherwise, the estimate is discarded, so as to not degrade downstream analysis or visualization of the surface.

The threshold for this decision rule considers that properties of the signal are not known in advance. However, properties of the noise can be determined through calibration and estimation procedures. The threshold may then be determined as follows. Considering a measurement is entirely due to noise, for a given false acceptance threshold $\tau_{FA}$, it is important to determine the probability that noise alone yields a peak reflection power above that threshold. Answering this question requires a probabilistic model of the noise. Given the noise model, the threshold can be adjusted to achieve the desired probability of false acceptance $p_{FA}$.

Back-Projected Noise Distribution

Let $w \in \mathbb{R}^N$ be an uncorrelated, jointly Gaussian random vector, so each element n is distributed as $$w_n \sim \mathcal{N}(0, \sigma_{w_n}^2).$$

The A-scan is formed by back-projecting the noise vector through the measurement matrix as $v = A^H w$. Each element of $v \in \mathbb{C}^M$ is the sum of independent Gaussian random variables with complex weights, $$v_m = \sum_{n=1}^{N} w_n S(\lambda_n) \exp\left(-\frac{i4\pi z_m}{\lambda_n}\right),$$

which is a complex Gaussian random variable with mean $$\mu_v = E[v_m] = \sum_{n=1}^{N} E[w\_n] S(\lambda_n) \exp(-i4\pi z_m/\lambda_n) = 0$$

and variance $$\sigma_v^2 = \mathrm{Var}[v_m] = \sum_{n=1}^{N} \mathrm{Var}[w_n] \left| S(\lambda_n) \exp\left\{-i4\frac{\pi z_m}{\lambda_n}\right\} \right|^2$$
$$= \sum_{n=1}^{N} \sigma_{w_n}^2 |S(\lambda_n)|^2.$$

Assuming $v_m$ is approximately circularly symmetric so that its real and imaginary components are independent and identically distributed, yields:

$$\mathfrak{R}\{v_m\}, \mathfrak{I}\{v_m\} \sim \mathcal{N}\left(0, \frac{\sigma_v^2}{2}\right).$$

Let the squared magnitude be $\xi_m = |v_m|^2 = \mathfrak{R}\{v_m\}^2 + \mathfrak{I}\{v_m\}^2$, which follows a Gamma $$(1, \sigma_v^2)$$

distribution, which is also an exponential random variable.

Now considering that there are $N_F \in \mathbb{Z}_+$ independent, identically distributed (i.i.d.) measurement frames of Gaussian noise $W = [w^{(1)}, \ldots, w^{(N_F)}]$ such as from $N_F$ snapshots taken over time. A useful property of the Gamma distribution is that the sum of $N_F$ i.i.d. Gamma (k, θ) random variables is Gamma $(N_F k, θ)$. So, if we have $N_F$ independent measurement frames, then summing the squares of their back-projected magnitudes yields:

18

$$\psi_m = \sum_{f=1}^{N_F} |v_m^{(f)}|^2 = \sum_{f=1}^{N_F} \xi_m^{(f)} \sim \mathrm{Gamma}(N_F, \sigma_v^2).$$

The sum of $N_F$ independent exponential random variables can also be described as an Erlang distribution with shape parameter $N_F$ and scale parameter $$\sigma_v^2.$$

Alternatively, suppose $N_F$ independent Gaussian measurements are combined, but the measurements are not identically distributed. This could occur when combining multiple similar measurements over space with different noise characteristics, or it could occur when combining snapshots over time with time-varying noise properties, or it could occur from combinations of measurements over both space and time. The sum of $N_F$ independent but not identically distributed Gamma random variables is only approximately Gamma-distributed. Methods of fitting the approximate Gamma parameters include moment matching or other parameter fitting methods (see for example Covo and Elalouf, "A novel single-gamma approximation to the sum of independent gamma variables, and a generalization to infinitely divisible distributions," *Electronic Journal of Statistics, vol.* 8, no. 1, pp. 894-926, January 2014, the contents of which is incorporated in its entirety).

Given the marginal distribution for the back-projected noise, it is desired to compute the probability that in at least one depth bin $z_m$, the amplitude is greater than some threshold τ. Equivalently, the probability of the complement that the amplitude in every bin is less than τ may be computed. However, the $\psi_m$ are not independent, because the $v_m$ are different weighted sums of the initial noise vector w. Nevertheless, assuming independent bins greatly simplifies the joint probability, which may be computed as:

$$p_{FA} \approx 1 - \prod_{m=1}^{M} Pr[\psi_m < \tau_{FA}] = 1 - \left[ F_\Psi(\tau_{FA}; N_F, \sigma_v^2) \right]^M,$$

where the cumulative distribution function of Wm assuming i.i.d. noise is $$F_\Psi(\tau; N_F, \sigma_v^2) = 1 - e^{-\frac{\tau}{\sigma_v^2}} \sum_{f=0}^{N_F-1} \frac{1}{f!}\left(\frac{\tau}{\sigma_v^2}\right)^f.$$

The threshold value $\tau_{FA}$ can then be determined numerically by solving for a given $p_{FA}$. In the special case of $N_F=1$, the threshold can be computed in closed form by considering the magnitude of the back-projection without squaring. Let $$\zeta = |v_m| = \sqrt{\mathfrak{R}\{v_m\}^2 + \mathfrak{I}\{v_m\}^2}$$

be the magnitude of the back-projected noise. Since $v_m$ is a circular complex Gaussian, the magnitude is a Rayleigh random variable with parameter $$\sigma_v^2/2$$

and CDF $$F(\zeta; \sigma_v^2) = 1 - \exp\left(-\frac{\zeta^2}{\sigma_v^2}\right).$$

Again, assuming independent depth bins, the false acceptance probability is then $$p_{FA} \approx 1 - \prod_{m=1}^{M} Pr[\zeta_m < t_{FA}] = 1 - \left[1 - \exp\left(-\frac{t_{FA}^2}{\sigma_v^2}\right)\right]^M,$$

which uses the closed form Rayleigh CDF and where $t_{FA}$ is distinguished as the threshold for the magnitude without squaring. Rearranging, the final reflection power threshold may be solved as:

$$\tau_{FA} = t_{FA}^2 = -\sigma_v^2 \log\left(1 - [1 - p_{FA}]^{\frac{1}{M}}\right).$$

An example of threshold selection is demonstrated in FIG. 4. The top row 410 shows an A-scan—the magnitude squared back-projection vector—for different numbers of frames. The A-scan is due to noise only, and the computed threshold τ successfully prevents false acceptance of a noise peak. The middle row 420 likewise shows an A-scan but from a measurement that contains two layers. As the number of frames increases, the relative threshold decreases so that both layers are detected while rejecting spurious peaks. The bottom row 430 shows the empirical distribution, i.e., a histogram of the A-scan values, as well as the expected marginal distribution based on the Gamma noise model. The expected distribution shows a very good fit to the histogram, yielding an effective threshold that prevents false acceptance of noise spikes.

Noise Calibration

OCT system noise properties vary by configuration, including balanced versus unbalanced detectors, high versus low SNR, etc. Here we describe a noise estimation procedure for a low-SNR system with an unbalanced detector according to some example embodiments. For an unbalanced detector, the detected intensity is approximately:

$$I^D[n] \propto S(k_n) + 2S(k_n)\sum_{\ell=1}^{L} a_\ell \cos[2k_n(z_\ell - z_R) + \phi_\ell] + v[n].$$

Since $a_\ell \ll 1$, the dominant intensity is due to the DC component, i.e., the scaled PSD $S(k_n)$. Assuming thermal and read noise are minimal, the dominant source of noise is intensity-dependent shot noise, which is Poisson-distributed and has variance proportional to the dominant intensity $S(k_n)$ Further assuming a low-SNR measurement, the cross-correlation terms $\sum_{\ell=1}^{L} a_\ell \cos[2 k_n( z_\ell - z_R) + \phi_\ell]$ can be ignored and the measurement $I^D[n]$ can be approximated as having mean proportional to $S(k_n)$ and zero-mean Gaussian noise $v[n]$ whose variance is proportional to $S(k_n)$. The only remaining uncertainty is then determining the constant of proportionality due to detector gain and other scaling factors.

According to some example embodiments, the wavelength-dependent noise variance may be estimated by a procedure described next. FIG. 5 shows how a separate noiseless, reference-only measurement 504 is made by blocking 506 the sample arm and averaging over a large number of frames. FIG. 6 then shows how the reference measurement 504 is used to guide the noise variance estimation. Reference measurement 504 is used as a proxy for the scaled PSD $S(k_n)$. Level sets of $S(k_n)$, i.e., wavenumbers $k_n$ with roughly equal $S(k_n)$ values are determined 610. The level sets are used to group together sample values 620 from an interference measurement $y_n$. The points belonging to each level set have the same mean and thus should have similar mean-dependent variance. The noise standard deviation has a scaled square-root relationship to the mean as confirmed in 630. Thus, the standard deviation estimates 640 can be assigned to each wavenumber $k_n$ within a level set.

It may be noted that this approach can be adapted regardless of the illumination pattern, e.g., scanning-point, line-field, or full-field OCT. For a line-field OCT measurement, the level sets may be computed across lateral (x) and wavelength (λ) coordinates, which yields a large number of points per level set for robust variance estimation.

FIG. 7 shows an exemplary comparison of the performance of the SSE algorithm with a few conventional surface estimation methods in the literature as the number of combined frames increases. It is to be noted that the comparison shown in FIG. 7 is non-limiting and only for illustrative purposes and it is contemplated that the experimental values of various parameters may be configurable to different set of values. The top row shows the B-scan, a set of A-scans along a lateral dimension of the sample, which is a coin covered by approximately 0.5 mm of dried glue. The top glue layer may be seen in the B-scans, whereas the ridges of the metal coin are barely visible. The method by Atalar et al. in the second row uses a threshold that adapts for each A-scan. The threshold is set as a fixed fraction of the maximum magnitude in the A-scan, and all peaks above that threshold are considered layer detections. The Atalar method accepts far too many spurious layers when the SNR is low, because the maximum peak is not much larger than the noise floor. The method by Lawman and Liang in the third row uses an a priori fixed number of surfaces and searches for each layer within pre-specified depth intervals. The Lawman method likewise accepts many spurious detections when there is not a strong peak for each layer. The last row shows the Sequential Surface Estimation (SSE) algorithm, which uses a threshold that adapts to the noise statistics in each A-scan. The SSE approach is much better at accepting only surface points that can be identified as true layers with high confidence.

FIGS. 8A, 8B and 8C show the SSE method used for full 3D surface reconstruction. In FIG. 8A, the specimen 810 is a metal coin with the left side covered by a layer of adhesive tape. Lateral slice reconstructions 820 in FIG. 8B show how the tape adheres to the coin at the highest features but not in the deepest crevices, so different parts of the reconstruction show one, two, or three distinct layers, including both the top and bottom of the tape. This specimen violates the assumptions of methods that assume the number of layers is known priori and consistent across a scan line. By combining lateral slices, a full 3D reconstruction 830 as shown in FIG. 8A may be generated that likewise shows different numbers of layers and reveals fine structures of the coin as well as the smooth tape surface.

FIG. 8C shows results for the specimen 850 consisting of a coin affixed with a layer of glue. The glue surface is translucent, and the optical path length through the glue is up to 1 mm, so the reflections from both the glue and coin are weak, leading to extremely low-SNR measurements. Combining the lateral line-scans results in a full 3D point cloud 860. Because the top glue surface and bottom coin layer are well-separated in depth, a depth threshold of −0.7 mm can be used to individually inspect the reconstruction of the top and bottom layers. The top glue surface 870 is almost completely recovered, while most of the coin surface 880 is recovered with a few gaps. As is evident from these results, the SSE approach described in reference to various example embodiments, is much better at accepting only surface points that can be identified as true layers with high confidence.

FIG. 9 illustrates a block diagram of some components of a system for implementing OCT, according to embodiments of the present disclosure. The computer 911 includes a processor 940, computer readable memory 912, storage 958 and user interface 949 with display 952 and keyboard 951, which are connected through bus 956. For example, the user interface 949 in communication with the processor 940 and the computer readable memory 912, acquires and stores the image data in the computer readable memory 912 upon receiving an input from a surface, keyboard 953 of the user interface 957 by a user.

The computer 911 can include a power source 954 and depending upon the application the power source 954 may be optionally located outside of the computer 911. Linked through bus 956 can be a user input interface 957 adapted to connect to a display device 948, wherein the display device 948 can include a computer monitor, a camera equipped display, television, projector, or mobile device, among others. A network interface controller (NIC) 934 is adapted to connect through the bus 956 to a network 936, wherein image data or other data, among other things, can be rendered on a third-party display device, third party imaging device, and/or third-party printing device outside of the computer 911.

Still referring to FIG. 9, the image data or other data, among other things, may be transmitted over a communication channel of the network 936, and/or stored within the storage system 958 for storage and/or further processing. Further, the time series data or other data may be received wirelessly or hard wired from a receiver 946 (or external receiver 938) or transmitted via a transmitter 947 (or external transmitter 939) wirelessly or hard wired, the receiver 946 and transmitter 947 are both connected through the bus 956. The computer 911 may be connected via an input interface 908 to external sensing devices 944, external sensors 904, and external input/output devices 941. For example, the external sensing devices 944 and external sensors 904 may include sensors gathering data before, during, or after a process or step executed in relation to a machine 902. One or more functionalities of the OCT system may be executed in a distributed environment and in such scenarios, the computer 911 may be connected to other external computers 942. An output interface 909 may be used to output the processed data from the processor 940. It is noted that the user interface 949 in communication with the processor 940 and the non-transitory computer readable storage medium 912, acquires and stores data in the non-transitory computer readable storage medium 912 upon receiving an input from a surface of the user interface 949 by a user. The computer 911 may also comprise a receiver 946 and a transmitter 947 to perform data communication with other devices such as an external receiver 938 and an external transmitter 939.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks. Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An optical coherence tomography (OCT) system for profilometry measurements of a specimen, comprising:
an interferometer configured to interfere a reflected test beam that is reflected from the specimen with a reflected reference beam to produce an interference pattern;
a spectrometer configured to measure a spectrum of the interference pattern to produce measurements of intensities of the interference pattern corresponding to different wavelengths;
a computer-readable memory configured to store executable instructions; and
a processor configured to execute the executable instructions to:
determine noise statistics of the intensities of the interference pattern;
use the noise statistics to set a threshold for detecting a number of layers of the specimen penetrated by the test beam at a location of the specimen based on a pre-specified probability of false acceptance of noise as a signal; and
determine the profilometry measurements as an estimate of depths of the layers of the specimen causing the intensities of the interference pattern above the threshold.

2. The OCT system of claim 1, wherein to determine the noise statistics, the processor is configured to:
obtain a smooth estimate of the spectrum of the interference pattern defining mean values of the noise statistics for the different wavelengths;
group the wavelengths based on similarities of their mean values to produce groups of wavelengths;
compute a group variance estimate within each of the groups of wavelengths; and
assign the group variance estimate to each wavelength in a group of wavelengths of the groups of wavelengths.

3. The OCT system of claim 2, wherein the smooth estimate of the spectrum of the interference pattern is obtained from a spectrum of the reference beam.

4. The OCT system of claim 1, wherein the processor is configured to produce the estimate of the depths of the layers of the specimen using a greedy optimization.

5. The OCT system of claim 1, wherein the noise statistics of the intensities of the interference pattern include noise variance for the location of the specimen as a function of wavelength.

6. The OCT system of claim 1, wherein the interferometer is further configured to:
split incident illumination into a test beam for illuminating the specimen and a reference beam;

receive, a reflection of the test beam from the location of the specimen, as the reflected test beam; and
receive, a reflection of the reference beam from a reference mirror, as the reflected reference beam.

7. The OCT system of claim 6, further comprising an illumination source configured to produce the incident illumination, the illumination source including one or a combination of a laser, a superluminescent diode (SLD), or a light-emitting diode (LED).

8. The OCT system of claim 1, wherein the spectrum comprises a signal intensity peak corresponding to each layer of the different layers of the specimen, and wherein to determine the profilometry measurements, the processor is configured to identify at least one candidate intensity peak in the spectrum as at least one signal intensity peak of the signal intensity peaks corresponding to the different layers of the specimen, based on the at least one candidate intensity peak having an intensity value above the threshold.

9. The OCT system of claim 8, wherein the processor is further configured to assign a location of the at least one candidate intensity peak having the intensity value above the threshold, as a depth of at least one corresponding layer of the different layers of the specimen.

10. The OCT system of claim 1, wherein the spectrometer comprises:
a diffraction grating configured to diffract different beams of different wavelengths forming the interference pattern into different diffraction angles; and
a detector array with detecting elements arranged at the different diffraction angles to measure intensities of different beams corresponding to the interference pattern.

11. The OCT system of claim 10, wherein the detecting elements of the detector array are calibrated to map each index of the detecting elements in the detector array with a corresponding wavelength.

12. The OCT system of claim 1, wherein the interferometer is a Michelson interferometer or a Linnik interferometer.

13. A method for profilometry measurements of a specimen in an optical coherence tomography (OCT) system, the method comprising:
interfering a reflected test beam, reflected from the specimen, with a reflected reference beam, reflected from a reference mirror, to produce an interference pattern;
measuring a spectrum of the interference pattern to produce measurements of intensities of the interference pattern corresponding to different wavelengths;
determining noise statistics of the intensities of the interference pattern;
using the noise statistics to set a threshold for detecting a number of layers of the specimen penetrated by the test beam at a location of the specimen based on a pre-specified probability of false acceptance of noise as a signal; and
determining the profilometry measurements as an estimate of depths of the layers of the specimen causing the intensities of the interference pattern above the threshold.

14. The method of claim 13, wherein determining the noise statistics comprises:
obtaining a smooth estimate of the spectrum of the interference pattern defining mean values of the noise statistics for the different wavelengths;
grouping the wavelengths based on similarities of their mean values to produce groups of wavelengths;
computing a group variance estimate within each of the groups of wavelengths; and assigning the group variance estimate to each wavelength in a group of wavelengths of the groups of wavelengths.

15. The method of claim 14, wherein the smooth estimate of the spectrum of the interference pattern is obtained from a spectrum of the reference beam.

16. The method of claim 13, further comprising producing the estimate of the depths of the layers of the specimen using a greedy optimization.

17. The method of claim 13, further comprising:

splitting incident illumination into a test beam for illuminating the specimen and a reference beam;

receiving, a reflection of the test beam from the location of the specimen, as the reflected test beam; and receiving, a reflection of the reference beam from a reference mirror, as the reflected reference beam.

18. The method of claim 13, wherein the spectrum comprises a signal intensity peak corresponding to each layer of the different layers of the specimen, and wherein for determining the profilometry measurements, the method further comprises identifying at least one candidate intensity peak in the spectrum as at least one signal intensity peak of the signal intensity peaks corresponding to the layers of the specimen, based on the at least one candidate intensity peak having an intensity value above the threshold.

19. The method of claim 18, further comprising assigning a location of the at least one candidate intensity peak having the intensity value above the threshold, as a depth of at least one corresponding layer of the layers of the specimen.

20. A non-transitory computer readable medium having stored thereon computer-executable instructions which when executed by a computer, causes the computer to perform a method for profilometry measurements of a specimen in an optical coherence tomography (OCT) system, the method comprising:

interfering a reflected test beam, reflected from the specimen, with a reflected reference beam, reflected from a reference mirror, to produce an interference pattern;

measuring a spectrum of the interference pattern to produce measurements of intensities of the interference pattern corresponding to different wavelengths;

determining noise statistics of the intensities of the interference pattern;

using the noise statistics to set a threshold for detecting a number of layers of the specimen penetrated by the test beam at a location of the specimen based on a pre-specified probability of false acceptance of noise as a signal; and determining the profilometry measurements as an estimate of depths of the layers of the specimen causing the intensities of the interference pattern above the threshold.

* * * * *